(12) United States Patent
Norman

(10) Patent No.: US 10,083,016 B1
(45) Date of Patent: Sep. 25, 2018

(54) PROCEDURALLY SPECIFYING CALCULATED DATABASE FIELDS, AND POPULATING THEM

(71) Applicant: LockPath, Inc., Overland Park, KS (US)

(72) Inventor: Timothy R. Norman, Overland Park, KS (US)

(73) Assignee: LockPath, Inc., Overland Park, KS (US)

(*) Notice: Subject to any disclaimer, the term of this patent is extended or adjusted under 35 U.S.C. 154(b) by 0 days.

(21) Appl. No.: 15/617,949

(22) Filed: Jun. 8, 2017

(51) Int. Cl.
*G06F 8/40* (2018.01)
*G06F 9/45* (2006.01)
*G06F 17/30* (2006.01)

(52) U.S. Cl.
CPC ............... *G06F 8/40* (2013.01); *G06F 8/42* (2013.01); *G06F 17/30292* (2013.01)

(58) Field of Classification Search
CPC ......... G06F 17/30292; G06F 8/42; G06F 8/40
See application file for complete search history.

(56) References Cited

U.S. PATENT DOCUMENTS

| | | | | |
|---|---|---|---|---|
| 7,484,205 B2* | 1/2009 | Venkatapathy | ..... | G06F 11/3624 717/158 |
| 8,874,621 B1* | 10/2014 | Goodwin | .......... | G06F 17/30292 707/756 |
| 2008/0104580 A1* | 5/2008 | Wilkinson | .............. | G06F 8/433 717/141 |
| 2012/0059919 A1* | 3/2012 | Glaser | ................. | G06F 11/3664 709/223 |
| 2016/0110547 A1* | 4/2016 | Dawson | ................ | G06F 21/577 726/25 |
| 2016/0253403 A1* | 9/2016 | Marin | ................ | G06F 17/30592 707/605 |
| 2017/0116116 A1* | 4/2017 | Mittal | ................. | G06F 12/0253 |

OTHER PUBLICATIONS

LockPath, Inc., Formula Basics (existing customer-facing materials describing current formula engine). https://lockpath.keylightgrc.com. Online publication written and produced at LockPath, Inc., Overland Park, Kansas. Website accessed Feb. 2, 2017.

(Continued)

*Primary Examiner* — Jacob D Dascomb
(74) *Attorney, Agent, or Firm* — Perkins Coie LLP

(57) ABSTRACT

A facility for defining a calculated distinguished database field is described. The facility receives a formula usable to calculate the value of the distinguished database field for each of a plurality of database rows, the formula expressed as a method in a distinguished procedural programming language. The facility transforms the formula method into a syntax tree for the distinguished procedural programming language. The facility modifies the syntax tree to provide variable context, field projection, runtimetype dynamic property accessors, and/or field path mapping. The facility transforms the modified syntax tree into a second version of the formula method in the distinguished procedural programming language.

30 Claims, 4 Drawing Sheets

(56) References Cited

OTHER PUBLICATIONS

LockPath, Inc., Formula Error Definitions (existing customer-facing materials describing current formula engine). https://lockpath.keylightgrc.com. Online publication written and produced at LockPath, Inc., Overland Park, Kansas. Website accessed Feb. 2, 2017.

LockPath, Inc., Formula Examples (existing customer-facing materials describing current formula engine). https://lockpath.keylightgrc.com. Online publication written and produced at LockPath, Inc., Overland Park, Kansas. Website accessed Feb. 2, 2017.

LockPath, Inc., Formula Functions and Operators (existing customer-facing materials describing current formula engine). https://lockpath.keylightgrc.com. Online publication written and produced at LockPath, Inc., Overland Park, Kansas. Website accessed Feb. 2, 2017.

* cited by examiner

PROCEDURALLY SPECIFYING CALCULATED DATABASE FIELDS, AND POPULATING THEM

CROSS-REFERENCE TO RELATED APPLICATION(S)

This application is related to the following applications, each of which is hereby incorporated by reference in its entirety: U.S. Provisional Application. No. 61/545,195 filed Oct. 9, 2011, entitled DYNAMIC CONTENT SYSTEMS AND METHODS; U.S. Provisional Application. No. 61/545,543 filed Oct. 10, 2011, entitled DYNAMIC CONTENT SYSTEMS AND METHODS; U.S. patent application Ser. No. 13/646,005 filed Oct. 5, 2012 (U.S. Pat. No. 8,874,621), entitled DYNAMIC CONTENT SYSTEMS AND METHODS; U.S. patent application Ser. No. 14/470,821 filed Aug. 27, 2014 (U.S. Pat. No. 9,594,778), entitled DYNAMIC CONTENT SYSTEMS AND METHODS; U.S. Provisional Application. No. 62/012,308 filed Jun. 14, 2014, entitled PERFORMING AN OBJECT RELATIONAL MODEL QUERY AGAINST A DATABASE THAT INCLUDES FIELDS DEFINED AT RUNTIME; and U.S. patent application Ser. No. 14/642,641 filed Mar. 9, 2015, entitled PERFORMING AN OBJECT RELATIONAL MODEL QUERY AGAINST A DATABASE THAT INCLUDES FIELDS DEFINED AT RUNTIME. In cases where material incorporated herein by reference conflicts with the present disclosure, the present disclosure controls.

BACKGROUND

In a database, any number of "objects," "records," or "rows" can be represented. A schema specifies a number of "fields," "attributes," or "members" for which a value can be stored for each object, record, or row. For example, the schema for an Employees table may specify the following fields: Name, Position, Salary, and Overhead. A sample portion of this table is shown below in Table 1.

TABLE 1

| Name | Position | Salary | Benefits |
|---|---|---|---|
| Ann Battle | Accountant | $77,000 | $17,500 |
| Greg Hamm | Assistant | $51,000 | $16,000 |

In some cases, the designer of a database table may wish to include a calculated field in the schema for the table. For example, a designer may wish to modify the schema for the table shown in Table 1 below to include the calculated field Total Cost, defined to be the sum of Salary and Benefits. Table 2 below shows the inclusion of the Total Cost calculated field.

TABLE 2

| Name | Position | Salary | Benefits | Total Cost |
|---|---|---|---|---|
| Ann Battle | Accountant | $77,000 | $17,500 | $94,500 |
| Greg Hamm | Assistant | $51,000 | $16,000 | $67,000 |

In populating the table shown in Table 2, for each row, the values of the Name, Position, Salary, and Benefits fields are obtained for each row from an external data source, or entered by a person. In some cases, such non-calculated fields are called "base fields" herein. Based on the definition of the Total Cost calculated field associated with the schema, the database itself calculates the value of the calculated field for each row, such as by adding $77,000 to $17,500 to obtain $94,500 for the Total Cost field in the first row.

DETAILED DESCRIPTION

Figure 1:
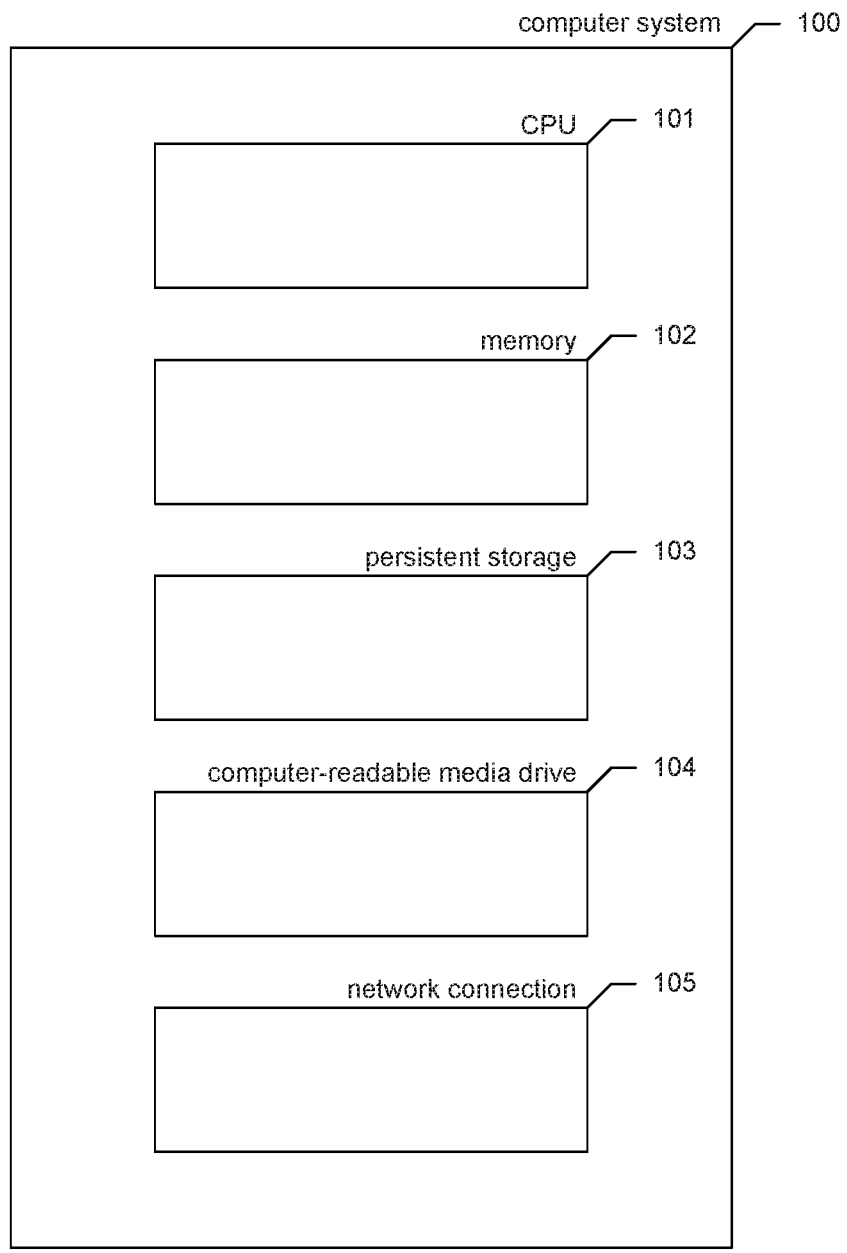
FIG. 1 is a block diagram showing some of the components typically incorporated in at least some of the computer systems and other devices on which the facility operates.

The inventor has noted that conventional approaches to specifying calculated fields and determining their value have several significant disadvantages. They have observed, for example, that conventional approaches to specifying calculated fields usually require them to be defined in a single expression, such as an expression that yields a numerical value, a Boolean value, a string value, or an enumerated value. In some cases, such expressions are limited to a fairly low level of complexity, while in others, significantly more complex expressions can be specified. In the case of low-complexity expressions, certain complex calculated fields cannot be accurately defined, or may require defining a complicated network of multiple, cascading calculated fields that ultimately yield the desired calculated field. In the case of high-complexity expressions, the high level of complexity can make the expression difficult to correctly express, effectively debug, or understand in retrospect. In some cases, the expressions on which calculated fields are based must be organized in non-intuitive ways, such as using Reverse Polish notation, which organizes operators and their operands in a way that many people are unable to easily grasp.

The inventor has further noted that the expressions defining some calculated fields include multiple references to the same base fields, and that conventional techniques for determining the value of calculated fields incur the overhead of retrieving these base fields for each of the multiple references in the expression. The inventor has also noted that, the expressions for some calculated fields rely on intermediate values that are based on other fields, and reference these intermediate values multiple times. In such cases, the subexpression must bodily recur multiple times in the expression defining the field—making the expression longer and more complex. Also, the subexpression must typically be recalculated for each of its occurrences in the expression, including the overhead of re-retrieving the values of other fields that the intermediate value relies upon.

The inventor has also observed that the logic conventionally available in expressions that define calculated fields can be limited, expensive to process, or both. For example, in some conventional techniques, the expression can contain a conditional value construct whose value is determined using a selected one of two or more alternative value subexpressions, selected based upon the value of another subexpression that is the subject of a condition. In these conventional techniques, all of the alternative value subexpressions are evaluated—not just the one selected for use—in such a valuation typically incurs overhead for retrieving base field values.

Additionally, the inventor has recognized that the techniques conventionally used to retrieve base field values for use in evaluating an expression defining a calculated field are relatively inefficient for this purpose, often imposing extra overhead by retrieving each base field of each row independently, committing resources to tracking retrieved base field values, etc.

To overcome disadvantages including those discussed above, the inventor has conceived and reduced to practice a software and/or hardware facility for procedurally generating and populating calculated database fields ("the facility"). As described below, the facility provides for using a common programming language to straightforwardly define calculated fields at arbitrary levels of complexity, in a way that enables them to be efficiently populated.

A developer uses the facility to define a calculated field by authoring a method that returns the calculated field's value in a procedural programming language, such as C# or another variant of the C language. The facility carefully limits the method's access to language features and resources that can produce adverse consequences, such as consuming excessive processing or database access resources or creating an unwarranted security risk.

The facility first subjects the developer-specified method to validation. In the validation process, the facility checks the "formula method" for prohibited and incorrect aspects, such as prohibited ("blacklisted") language features, types not on a list of approved types ("whitelisted"), calls to methods not on a list of approved methods, and invalid field paths. In some embodiments, the facility performs validation by (1) surrounding the formula method with a contextual validation template; (2) transforming this "templated" formula method into an equivalent syntax tree; and (3) performing an analytical traversal of the syntax tree. If the facility identifies any error during validation, they are surfaced to the developer, and validation must subsequently succeed in order to proceed to translation.

After successful validation, the facility submits the formula method to translation into a form that can be compiled and executed by the database engine to populate instances of the calculated field. In some embodiments, the facility performs translation by (1) surrounding the formula method with a contextual translation template; (2) transforming this "templated" formula method into an equivalent tree; (3) performing an analytical traversal of the syntax tree in which the syntax tree is modified; and (4) transforming the modified syntax tree into equivalent source code, which can then be compiled and executed by the database engine.

By performing in some or all of these ways, the facility makes it easy for a developer to define a calculated field, and significantly more efficient to populate this calculated field.

Also, by performing in some or all of the ways described above and storing and executing calculated field definitions in efficient ways, the facility meaningfully reduces the hardware resources needed to do so, including, for example: reducing the amount of storage space needed to store the information relating to calculated field definitions; and reducing the number of processing cycles needed to store, retrieve, or process information relating to calculated field definitions. This allows programs making use of the facility to execute on computer systems that have less storage and processing capacity, occupy less physical space, consume less energy, produce less heat, and are less expensive to acquire and operate. Also, such a computer system can respond to user requests for reports or queries against calculated fields with less latency, producing a better user experience and allowing users to do a particular amount of work in less time.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
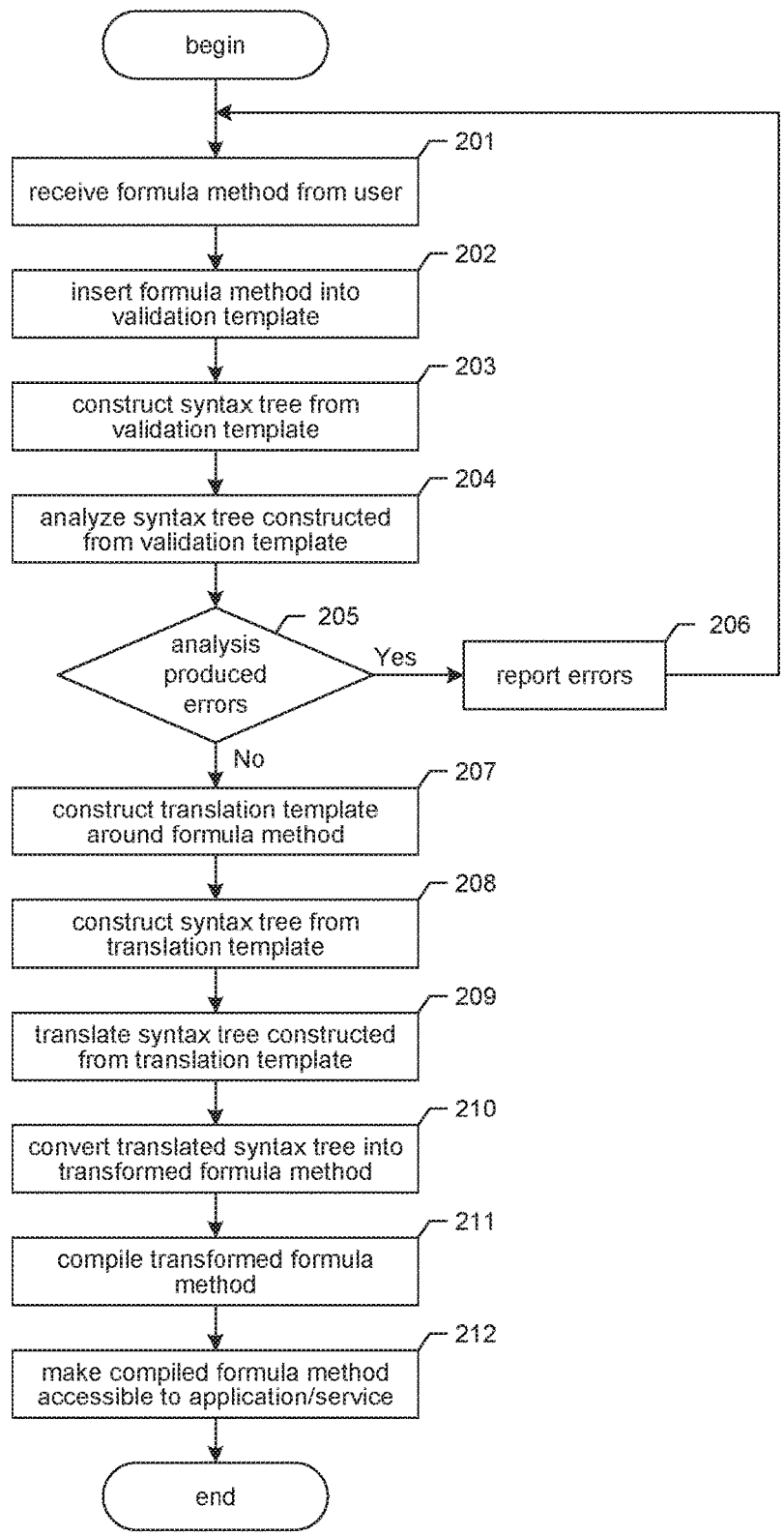
FIG. 2 is a flow diagram showing a process performed by the facility in some environments to define a calculated field.

FIG. 2 is a flow diagram showing a process performed by the facility in some environments to define a calculated field. In act 201, the facility receives the formula method from a developer or other user. Examples of these formal methods are described below in connection with Tables 3-8 below.

Table 3 below shows a simplified formula method template that the developer can edit in order to define a calculated field.

TABLE 3

| 1 | public int? MyFormula(Record record) |
| 2 | { |
| 3 | int? value - null; |
| 4 | |
| 5 | // Your code here. |
| 6 | |
| 7 | return value; |
| 8 | } |

The example shown in Table 3 yields a basic numeric field. For fields representing other data types, the occurrences of "int?" would differ to reflect the appropriate type.

Tables 4 and 5 below contrast a conventional approach to defining a calculated field (Table 4) with the corresponding function method specified in accordance with the facility (Table 5). In both cases, formulas are specified that determine a value for a record on a component called "Devices" by retrieving the maximum of (1) the depreciated MSRP and (2) the depreciated purchase price padded by 12 percent of the MSRP.

TABLE 4

```
1  Max(MSRP * (1.0 − Max(0, Year(Now( )) − Year(Devices.AcquisitionDate) *
2  Devices.AnnuaLDeprecationRate)),
3  Devices.AcquisitionCost − (1.0 − Max(0, Year(Now( )) − Year(Devices.AcquisitionDate)
4  Devices.AnnuaLDeprecationRate)) + (.12 * MSRP))
```

It can be seen in the conventional approach shown in Table 4 above, a complex expression (bolded) must be repeated in lines 1-2 and lines 3-4 because of the unavailability of any variable that can store the value of this expression.

TABLE 5

```
1   public Double? MyFormula(Record record)
2   {
3           double depreciatedPercent = 1.0 − Max(0, DateTime.Now.Year −
4   record.GetValue<DateTime?>("AcquisitionDate").Year) *
5               record.GetValue<Double?>("AnnualDepreciationRate");
6
7           return Max(record.GetValue<Double?>("MSRP") * depreciatedPercent,
8   record.GetValue<Double?>("AcquisitionCost") *
9               depreciatedPercent + (.12 * record.GetValue<Double?>("MSRP")));
10  }
```

It can be seen in the function method specified in accordance with the facility shown in Table 5 above that the complex expression is assigned to a variable in lines 3-4, which is then referenced (bolded) in lines 7 and 9.

In some embodiments, the facility also provides branching, such as with if/else statements and/or case statements. Whereas variable declaration adds reusable state to linear processing, forward-only branching allows processing to become non-linear. If/else and case statements implicitly support structured processing blocks which, when combined with variables, enables highly structured code. Tables 6 and 7 below show the streamlining effect that branching and variables have on more complex formulas. In both cases, a formula determines a perceived value of an item based on whether an item's wholesale price is less than its MSRP as a factor of that price difference; if the factor is too extreme, then it is attenuated. The resulting factor is then applied to whichever was better of the two prices.

TABLE 6

```
1   (Devices.WholesaleCasePrice / Devices.WholesaleCaseQty < Devices.MSRP ?
2   Devices.WholesaleCasePrice / Devices.WholesaleCaseQty : Devices.MSRP) *
3           (Devices.WholesaleCasePrice / Devices.WholesaleCaseQty < Devices.MSRP ?
4               (1 + (Devices.MSRP − (Devices.WholesaleCasePrice / Devices.WholesaleCaseQty) /
5   (Devices.WholesaleCasePrice / Devices.WholesaleCaseQty))) :
6               (1 − ((Devices.WholesaleCasePrice / Devices.WholesaleCaseQty) − Devices.MSRP)
7   / Devices.MSRP)) < 0.5 | |
8           (Devices.WholesaleCasePrice / Devices.WholesaleCaseQty < Devices.MSRP ?
9               (1 + (Devices.MSRP − (Devices.WholesaleCasePrice / Devices.WholesaleCaseQty) /
10  (Devices.WholesaleCasePrice / Devices.WholesaleCaseQty))) :
11              (1 − ((Devices.WholesaleCasePrice / Devices.WholesaleCaseQty) − Devices.MSRP)
12  / Devices.MSRP)) >1.5 ?
13              (Devices.WholesaleCasePrice / Devices.WholesaleCaseQty < Devices.MSRP ?
14                  (1 + (Devices.MSRP − (Devices.WholesaleCasePrice /
15              Devices.WholesaleCaseQty) / (Devices.WholesaleCasePrice /
16              Devices.WholesaleCaseQty))) :
17                  (1 − ((Devices.WholesaleCasePrice / Devices.WholesaleCaseQty) −
18  Devices.MSRP) / Devices.MSRP)) +
19                  ((1 − Devices.WholesaleCasePrice / Devices.WholesaleCaseQty <
20  Devices.MSRP ?
21                      (1 + (Devices.MSRP − (Devices.WholesaleCasePrice /
22                  Devices.WholesaleCaseQty) / (Devices.WholesaleCasePrice /
23                  Devices.WholesaleCaseQty))) :
24                      (1 − ((Devices.WholesaleCasePrice /
25                  Devices.WholesaleCaseQty) − Devices.MSRP) / Devices.MSRP)) /
26                  2)) :
27              (Devices.WholesaleCasePrice / Devices.WholesaleCaseQty < Devices.MSRP ?
28                  (1 + (Devices.MSRP − (Devices.WholesaleCasePrice /
29  Devices.WholesaleCaseQty) / (Devices.WholesaleCasePrice / Devices.WholesaleCaseQty))) :
30                  (1 − ((Devices.WholesaleCasePrice / Devices.WholesaleCaseQty) −
31  Devices.MSRP) / Devices.MSRP))
```

In the conventional approach to defining this calculated field shown above in Table 6, it can be seen that in planning the formula described below involve significant complexity and repetition of expressions, where each repetition may involve the re-retrieval of the referenced fields. In particular, the wholesale cost must be redundantly computed each time it is referenced. Compounding this is the conditional calculation of values, especially the value adjustment. Indeed, the formula is forced to replicate the conditional calculation of the unit price and the initial, pre-adjusted, adjustment factor in its entirety.

TABLE 7

```
1   public Double? MyFormula(Record record)
2   {
3        double valueAdjustmentFactor = 0.0;
4        double wholesaleCost = record.GetValue<double?>("WholesaleCasePrice") /
5   record.GetValue<int?>("WholesaleCaseQty");
6        double unitPrice = Math.Min(wholesaleCost, record.GetValue<double? >("MSRP");
7
8        if (wholesaleCost < record.GetValue<double?>("MSRP"))
9             valueAdjustmentFactor = 1 + ((record.GetValue<double - >("MSRP") - unitPrice) /
10  unitPrice);
11       else
12            valueAdjustmentFactor = 1 - (wholesaleCost - unitPrice) / unitPrice);
13
14       if(valueAdjustmentFactor < 0.5 ||valueAdjustmentFactor > 1.5)
15            valueAdjustmentFactor = valueAdjustmentFactor + ((1 - valueAdjustmentFactor) /
16  2);
17
18       return unitPrice * valueAdjustmentFactor;
19  }
```

In contrast, can be seen in the approach in accordance with the facility shown above in Table 7 that the formal is more concise, with very little repetition, and significantly more intelligible.

Table 8 below shows an example in which three calculated fields are defined in accordance with the facility, on lines 1-7, 9-13, and 15-19.

TABLE 8

```
1             public static String Formula_1(LockPath.Keylight.Data.LUMA.RuntimeType record)
2             {
3                  return String.Format("Verbose Description:{0} - {1}:{2}",
4   (String)record.GetValue("Field_3955208782"),
5                       (DateTime?)record.GetValue("Field_3451238287"),
6   (DateTime?)record.GetValue("Field 1508559810"));
7             }
8
9             public static DateTime? Formula_2(LockPath.KeyLight.Data.LUMA.RuntimeType
10  record)
11            {
12                 return (DateTime?)record.GetValue("Field 1508559810");
13            }
14
15            public static double? Formula_3(LockPath.KeyLight.Data.LUMA.RuntimeType
16  record)
17            {
18                 return (double?)record.GetValue"'Field 4237443165");
19            }
```

Returning to FIG. 2, in act 202, the facility inserts the formula method received in act 201 into a validation template. Table 9 below shows an empty validation template used by the facility in some embodiments. In the validation template, a stub class is provided as a proxy to the LUMARecord class. The stub class exposes a simpler and more purposefully limited syntax.

TABLE 9

```
1   namespace RuntimeFormula
2   {
3        using static System.Math;
4        using DateTime = System.DateTime;
5        using Guid = System.Guid;
6        using String = System.String;
```

TABLE 9-continued

```
7        using IPAddress = LockPath.Keylight.Utility.IPAddressMk2;
8
9        public sealed class Record
10       {
11               public TResult GetValue<TResult>(string fieldPath)
12               {
13                       return (TResult)System.Activator.CreateInstance(typeof(TResult));
14               }
15
16               public TResult Min<TResult>(string fieldPath,
17  System.Linq.Expressions.Expression<System.Func<Record, bool>>
18                       subRecordFilter = null)
19               {
20                       return (TResult)System.Activator.CreateInstance(typeof(TResult));
21               }
22
23               public TResult Max<TResult>(string fieldPath,
24  System.Linq.Expressions.Expression<System.Func<Record, bool>>
25                       subRecordFilter = null)
26               {
27                       return (TResult)System.Activator.CreateInstance(typeof(TResult));
28               }
29
30               public TResult Average<TResult>(string fieldPath,
31  System.Linq.Expressions.Expression<System.Func<Record,
32                       bool>> subRecordFilter = null)
33               {
34                       return (TResult)System.Activator.CreateInstance(typeof(TResult));
35               }
36
37               public TResult Sum<TResult>(string fieldPath,
38  System.Linq.Expressions.Expression<System.Func<Record, bool>>
39                       subRecordFilter = null)
40               {
41                       return (TResult)System.Activator.CreateInstance(typeof(TResult));
42               }
43
44               public TResult Count<TResult>(string fieldPath,
45  System.Linq.Expressions.Expression<System.Func<Record, bool>>
46                       subRecordFilter = null)
47               {
48                       return (TResult)System.Activator.CreateInstance(typeof(TResult));
49               }
50       }
51
52       public sealed class FormulaWrapper
53       {
54               public int? MyFormula(Record record)
55               }
56                       int? value = null;
57
58                       // Your code here.
59
60                       return value;
61               }
62               public static String IdentitySeed(String identityPrefix, int
63  minNumericSeedLength, char
64                       numericSeedPaddingCharacter, String identitySuffix)
65               {
66                       return String.Format("""{{0}}\0{{1}}\0{{2}}""", identityPrefix, new
67  String(numericSeedPaddingCharacter,
68                       minNumericSeedLength), identitySuffix);
69               }
70       }
71  }
```

Lines 54-61 are the point which the facility inserts the formula method specified by the developer. For example, Table 11 below shows a validation template into which the facility has inserted a received formula method shown in Table 10 below.

TABLE 10

```
1  public Double? MyFormula(Record record)
2  {
3       Assembly assembly = Assembly.LoadFrom("C:\\Hacker.ToolKit.dll");
```

TABLE 10-continued

```
4       Type[ ] types = assembly.GetTypes( );
5
6       System.Network.HackThePlanet.FormatInterwebs( );
7
8       return null;
9  }
```

TABLE 11

```
1  namespace RuntimeFormula
2  {
3      using static System.Math;
4      using DateTime = System.DateTime;
5      using Guid = System.Guid;
6      using String = System.String;
7      using IPAddress = LockPath.Keylight.Utility.IPAddressMk2;
8
9      public sealed class Record
10     {
11         public TResult GetValue<TResult>(string fieldPath)
12         {
13             return (TResult)System.Activator.CreateInstance(typeof(TResult));
14         }
15
16         public TResult Min<TResult>(string fieldPath,
17  System.Linq.Expressions.Expression<System.Func<Record, bool>>
18             subRecordFilter = null)
19         {
20             return (TResult)System.Activator.CreateInstance(typeof(TResult));
21         }
22
23         public TResult Max<TResult>(string fieldPath,
24  System.Linq.Expressions.Expression<System.Func<Record, bool>>
25             subRecordFilter = null)
26         {
27             return (TResult)System.Activator.CreateInstance(typeof(TResult));
28         }
29
30         public TResult Average<TResult>(string fieldPath,
31  System.Linq.Expressions.Expression<System.Func<Record,
32             bool>> subRecordFilter = null)
33         {
34             return (TResult)System.Activator.CreateInstance(typeof(TResult));
35         }
36
37         public TResult Sum<TResult>(string fieldPath,
38  System.Linq.Expressions.Expression<System.Func<Record, bool>>
39             subRecordFilter = null)
40         {
41             return (TResult)System.Activator.CreateInstance(typeof(TResult));
42         }
43
44         public TResult Count<TResult>(string fieldPath,
45  System.Linq.Expressions.Expression<System.Func<Record, bool>>
46             subRecordFilter = null)
47         {
48             return (TResult)System.Activator.CreateInstance(typeof(TResult));
49         }
50     }
51
52     public sealed class FormulaWrapper
53     {
54         public Double? MyFormula(Record record)
55         {
56             Assembly assembly = Assembly.LoadFrom ("C:\\hacker.ToolKit.dll");
57             Type [ ] types = assembly.GetTypes( );
58
59             System.Network.HackThePlanet.FormatInterwebs( );
60
61             return null;
62         }
63         public static String IdentitySeed(String identityPrefix, int
64  minNumericSeedLength, char
66             numericSeedPaddingCharacter, String identitySuffix)
66         {
67             return String.Format(""{{0}}\0{{1}}\0{{2}}"", identityPrefix, new
68  String(numericSeedPaddingCharacter,
```

TABLE 11-continued

| | |
|---|---|
| 69 | minNumericSeedLength), identitySuffix); |
| 70 | } |
| 71 | } |
| 72 | } |

Lines 54-62 are the point which the facility has inserted the formula method specified by the developer shown in Table 10.

Returning to FIG. 2, in act 203, the facility constructs a syntax tree from the completed validation template produced in act 202. In some embodiments, the facility performs the syntax tree construction in act 203 using the ROSLYN framework from MICROSOFT CORPORATION of Redmond, Wash. Table 12 below shows the syntax tree constructed by the facility in act 203 using the completed validation template shown above in Table 11.

TABLE 12

```
1         [MethodDeclaration] public static String Formula_28(Record record)
2             [IdentifierName] String
3             [ParameterList] (Record record)
4                 [Parameter] Record record
5                     [IdentifierName] Record
6             [Block]
7                 [LocalDeclarationStatement] Assembly assembly =
8  Assembly.LoadFrom("C:\\Nacker.ToolKit.dll");
9                     [VariableDeclaration] Assembly assembly =
10 Assembly.LoadFrom("C:\\Nacker.ToolKit.dll")
11                        [IdentifierName] Assembly
12                        [VariableDeclarator] assembly = Assembly.LoadFrom("C:\\Nacker.ToolKit.dll")
13                            [EqualsValueClause] = Assembly.LoadFrom("C:\\Nacker.ToolKit.dll")
14                                [InvocationExpression] Assembly.LoadFrom("C:\\Nacker.ToolKit.dll")
15                                    [SimpleMemberAccessExpression] Assembly.LoadFrom
16                                        [IdentifierName] Assembly
17                                        [IdentifierName] LoadFrom
18                                    [ArgumentList] ("C:\\Nacker.ToolKit.dll")
19                                        [Argument] "C:\\Nacker.ToolKit.dll"
20                                            [StringLiteralExpression] "C:\\Nacker.ToolKit.dll"
21                 [LocalDeclarationStatement] Type[ ] types = assembly.GetTypes( );
22                     [VariableDeclaration] Type[ ] types = assembly.GetTypes( )
23                        [ArrayType] Type[ ]
24                            [IdentifierName] Type
25                            [ArrayRankSpecifier] []
26                                [OmittedArraySizeExpression]
27                        [VariableDeclarator] types = assembly.GetTypes( )
28                            [EqualsValueClause] = assembly.GetTypes( )
29                                [InvocationExpression] assembly.GetTypes( )
30                                    [SimpleMemberAccessExpression] assembly.GetTypes
31                                        [IdentifierName] assembly
32                                        [IdentifierName] GetTypes
33                                    [ArgumentList] ( )
34                 [ReturnStatement] return record.GetValue<Double? >("Incorrect.Path");
35                     [InvocationExpression] record.GetValue<Double? >("Incorrect.Path")
36                        [SimpleMemberAccessExpression] record.GetValue<Double?>
37                            [IdentifierName] record
38                            [GenericName] GetValue<Double? ?
39                                [TypeArgumentList] <Double? ?
40                                    [NullableType] Double?
41                                        [IdentifierName] Double
42             [ArgumentList] ("Incorrect.Path")
43             [Argument] "Incorrect.Path"
44             [StringLiteralExpression] "Incorrect.Path"null;
```

The sample syntax tree shown in Table 12 above omits certain features—such as wrapper class, namespace and using directives—which produce an excess of additional tree nodes that provide little illustrative value here.

In act 204, the facility analyzes the syntax tree constructed in act 203 from the validation template in order to perform validation of the formula method received in act 201. In act 205, if the analysis performed in act 204 produced errors, then the facility continues in act 206, else the facility continues in act 207. In act 206, the facility reports the errors produced by the analysis. After act 206, the facility continues in act 201 to receive a revised formula method and repeat the validation process with respect to it.

In some embodiments, the analysis of act 204 involves traversing the elements of the syntax tree, generating errors when prohibited language features or other prohibited behavior is encountered during the traversal. In some embodiments, because of the very basic nature of the code graph, the facility's tree traversal tracks language-specific state such as namespaces, variable scope, implicit vs. explicit variable typing, etc.; in doing so the facility cordons off the C# features that are unsuitable for a lean scripting environment.

Figure 3:
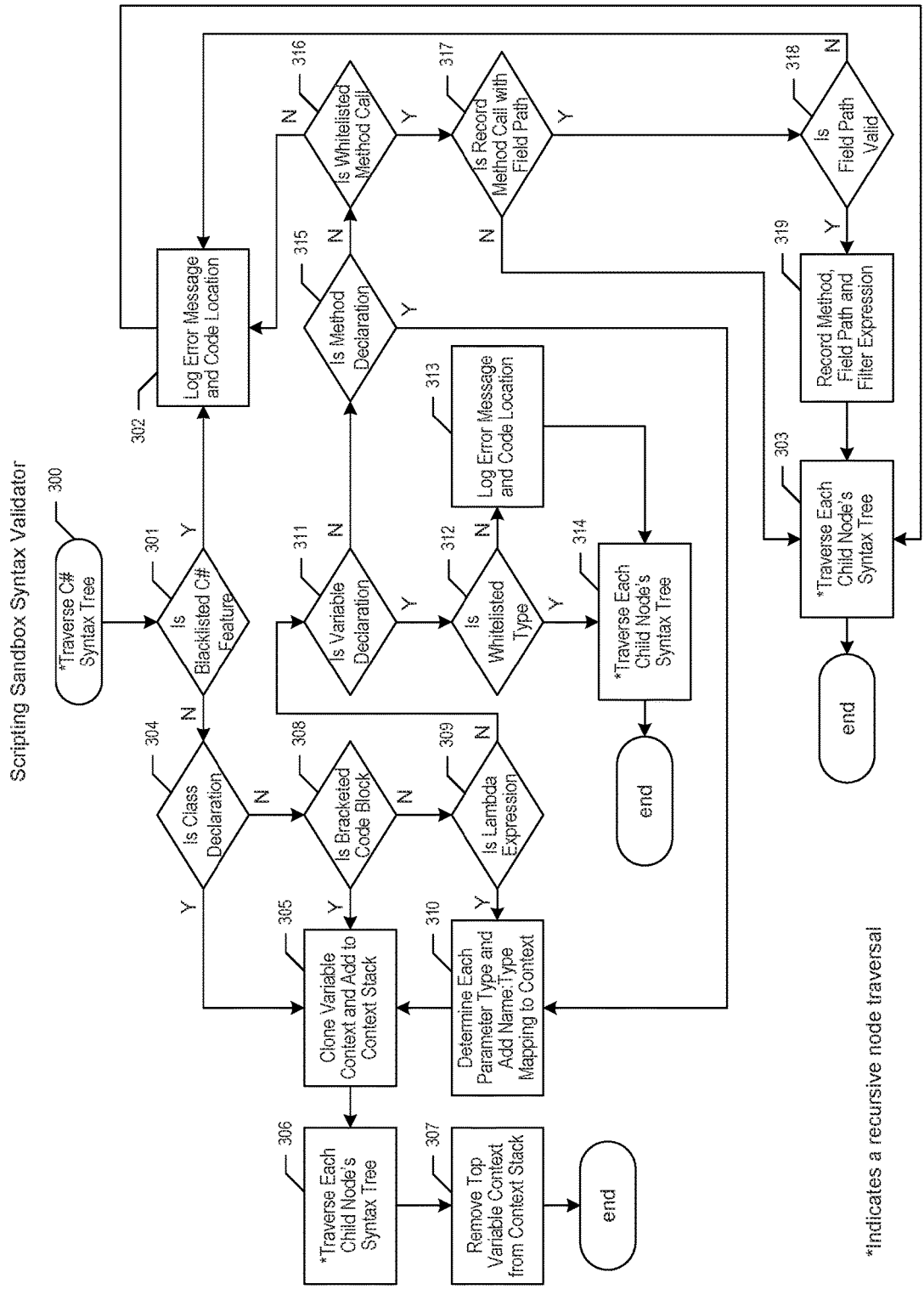
FIG. 3 is a flow diagram showing a process performed by the facility in some embodiments to perform validation of the formula method.

FIG. 3 is a flow diagram showing a process performed by the facility in some embodiments to perform validation of the formula method. The process 300 is called with respect to a particular node of the syntax tree. Initially, this is the root of the syntax tree—the node shown in line 1 of the sample syntax tree shown in Table 12. The process recursively calls itself in order to traverse from the present node to another node, as part of traversing some or all of the syntax tree across all of the cost of the process. In the flow diagram, acts that recursively call the process are preceded with an asterisk: acts 303, 306, and 314. Each time the facility arrives at act 302 or 313, it logs an error which will prevent the formula method from being translated.

In act 301, if the node is a blacklisted language feature, then the facility continues in act 302, else the facility continues in act 304. In some embodiments, the language feature blacklist includes some or all of the following: defining/constructing arrays; threading features like await and lock; crefs; for, for-each, while and do-while loops; class, property and method declarations; inline compiler directives and pragmas; unsafe blocks and pointers; exception throwing; typeof and Object.GetType( ) access; namespace using directives; lambda functions and delegates and invocation of non-whitelist methods.

In some embodiments, the language feature blacklist includes some or all of the following:
  Namespace inclusion to prevent access to code and/or libraries outside of the sandbox.
  Looping: for, for-each, while and do-while to ensure timely execution.
  Goto statements to prevent faux looping.
  Anonymous function/delegate/lambda declarations to block potentially recursive execution.
  Class/Structure/Method declaration to limit checking to the formula method body.
  Raw type determination to prevent reflection and access to type/method/assembly metadata.
  Implicit or explicit assembly usage to prevent access to environmental metadata and block the ability to load external assemblies manually.
  Arrays and collection classes to prohibit bulk allocation of memory resources.
  "Unsafe" block declarations to prevent direct memory access (hence the unambiguous C# keyword "unsafe").
  Whitelists to limit fully qualified names (e.g. System.File.OpenWrite( )) for variable creation or static method access to a prescribed list of safe classes and methods.
  Threading: locks, semaphores, etc. to avoid deadlocking scenarios.
  Compiler pragmas that could be used to alter the compiled output of the formula kernel.
  File system and network access to prevent access to internal systems and/or execution of undesirable code or functionality.

In act 302, the facility logs an error message and the corresponding node (or other indication of code location at which the error occurred). In act 303, the facility recursively calls the process to traverse to each of the node's children. After act 303, the process ends/returns.

In act 304, if the node is a class declaration, than the facility continues in act 305, else the facility continues in act 308. In act 305, the facility clones the variable context and adds the cloned variable context to the context stack. In act 306, the facility recursively calls the process to traverse to each of the node's children. In act 307, the facility removes the top variable context from the context stack. After act 307, the process ends/returns.

In act 308, if the node is a bracketed code block, then the facility continues in act 305, else the facility continues in act 309. In act 309, if the note is a lambda expression, than the facility continues in act 310, else the facility continues in act 311. In act 310, for each parameter, the facility determines the parameter's type and adds a corresponding parameter name:type mapping to the context. After act 310, the facility continues in act 305.

In act 311, if the node is a variable declaration, then the facility continues in act 312, else the facility continues in act 315. In act 312, if the variable is declared to be of a whitelisted type or class, then the facility continues in act 314, else the facility continues in act 313. In some embodiments, the list of whitelisted types or classes includes some or all of the following: Math, Guid, String, DateTime, IPAddressMk2 (an alternative to .NET's IPAddress class).

In act 313, the facility logs an error message and the corresponding node (or other indication of code location at which the error occurred). In act 314, the facility recursively calls the process to traverse to each of the node's children. After act 314, the process ends/returns.

In act 315, if the node is a method declaration, then the facility continues in act 310, else the facility continues in act 316. In act 316, if the declared method is a whitelisted method call, then the facility continues in act 317, else the facility continues in act 302. In act 317, if the method call is a record method call with the field path, then the facility continues in act 318, else the facility continues in act 303. In act 318, if the field path contained by the record method call is valid, then the facility continues in act 319, else the facility continues in act 302. In act 319, the facility records the method, field path, and filter expression. After act 319, the facility continues in act 303.

Those skilled in the art will appreciate that the acts shown in FIG. 3 and in each of the flow diagrams discussed herein may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

The following description details the facility's performance of the validation process for the completed validation template shown in Table 11 above by traversing the syntax tree shown in Table 12 above. To process the node in line 1 of Table 12 ("Step 1"): Because this node is a method declaration, the facility proceeds through acts 301, 304, 308, 309, 311, and 315 to act 310. In acts 310 and 305, the facility maps each parameter to a valid type and adds to a copy of the current contextual mapping which is then pushed onto the contextual stack as the new current context. In act 306, the facility proceeds to the child nodes on lines 2 and 3 of Table 12.

To process the nodes in lines 2 and 3 of Table 12 ("Step 2"): Because each of these is a variable declaration, the facility proceeds through acts 301, 304, 308, 309, and 311 to act 312. Because the type is white listed in each case, the facility proceeds to act 314. There are no children to traverse to in act 314, so the process returns.

Upon completion of Step 2, control returns to where Step 1 left off to process the remaining child of the method node: its body, beginning in line 6 ("Step 3"). As with many of the node types in the code graph, the "Block" representing a method's body is not intercepted for processing so the Roslyn traversal functionality moves on to processing the child nodes which in this case are the programmatic expressions that represent each line of code in the method body.

To process the nodes in lines 7-20 of Table 12 ("Step 4"): The first line of the method body—line 7—is a variable declaration. Recursive processing of child nodes from line 7 results in line 9 failing the whitelist test in act 312 that follows the "Is Variable Declaration" test in act 311. The facility logs an error in act 313 for later presentation to the user and processing continues. Upon reaching Line 14, the facility logs another error upon failing the "Is Whitelisted Method Call" check.

To process the nodes in lines 21-33 of Table 12 ("Step 5"): The second line of the method body follows Step 4 and recursively processes its children. Line 22 is a prohibited type and is processed and logged as described in Step 4. Upon reaching Line 23, the "Is Blacklisted C# Feature" test in act 301 intercepts the array declaration, which is not permitted, and again logs the error in act 302. Again, similar to the processing of Line 14 in Step 4, the method call fails the whitelist check and the facility logs another error.

To process the nodes in lines 34-44 ("Step 6"): The facility recursively traverses final line, the method's return statement, as in Steps 4 and 5. This time, however, the invocation from Line 35 succeeds. The "Record.GetValue" call there is identified as one that includes a field path, so any argument known to be a field path for that method is parsed and validated against the "Devices" component as the starting point for the relational traversal then confirming that each subsequent step in the path exists and is 1:1 for all but the last step. The facility detects the incorrect field path and as another error to the list.

Upon completion, any errors are displayed to the formula editor for the user to address the issues and resubmit the formula. Transformation and compilation only proceeds after validation by the facility produces no errors.

In contrast to the first example shown above in Tables 10-12, a second example follows in which validation is successful. The formula method for the second example is shown below in Table 13.

TABLE 13

```
1    public static Decimal? Formula_32(Record record)
2    {
3        return record.GetValue<Decimal?>("MSRP") -
4    record.GetValue<Decimal?>("Cost");
5    }
```

Table 14 below shows the insertion of the function method for the second example shown in Table 13 into the validation template.

TABLE 14

```
1    namespace RuntimeFormula
2    {
3        using static System.Math;
4        using DateTime = System.DateTime;
5        using Guid = System.Guid;
6        using String = System.String;
7        using IPAddress = LockPath.Keylight.Utility.IPAddressMk2;
8
9        public sealed class Record
10       {
11           public TResult GetValue<TResult>(string fieldPath)
12           {
13               return (TResult)System.Activator.CreateInstance(typeof(TResult));
14           }
15
16           public TResult Min<TResult>(string fieldPath,
17    System.Ling.Expressions.Expression<System.Func<Record, bool>>
18               subRecordFilter = null)
19           {
20               return (TResult)System.Activator.CreateInstance(typeof(TResult));
21           }
22
23           public TResult Max<TResult>(string fieldPath,
24    System.Ling.Expressions.Expression<System.Func'1Record, bool>>
25               subRecordFilter = null)
26           {
27               return (TResult)System.Activator.CreateInstance(typeof(TResult));
28           }
29
30           public TResult Average<TResult>(string fieldPath,
31    System.Ling.Expressions.Expression<System.Func<Record,
32               bool>> subRecordFilter = null)
33           {
34               return (TResult)System.Activator.CreateInstance(typeof(TResult));
35           }
36
37           public TResult Sum<TResult>(string fieldPath,
38    System.Ling.Expressions.Expression<System.Func<Record, bool>>
39               subRecordFilter = null)
40           {
41               return (TResult)System.Activator.CreateInstance(typeof(TResult));
42           }
43
44           public TResult Count<TResult>(string fieldPath,
45    System.Ling.Expressions.Expression<System.Func<Record, bool>>
```

TABLE 14-continued

```
46                    subRecordFilter = null)
47                {
48                        return (TResult)System.Activator.CreateInstance(typeof(TResult));
49                }
50          }
51
52          public sealed class FormulaWrapper
53          {
54                  public static Decimal? Formula_32(Record record)
55                  {
56                        return record.GetValue<Decimal? >("MSRP") –
57   record.GetValue<Decimal?>("Cost");
58                  }
59                  public static String IdentitySeed(String identityPrefix, int
60   minNumericSeedLength, char
61                        numericSeedPaddingCharacter, String identitySuffix)
62                  {
63                        return String.Format("""{{0}}\0{{1}}1\0{{2 }}""", identityPrefix, new
64   String(numericSeedPaddingCharacter,
65                              minNumericSeedLength), identitySuffix);
66                  }
67          }
68   }
```

Lines 54-58 are the point which the facility has inserted the formula method specified by the developer shown in Table 13.

To perform validation for the second example shown in Tables 13-14, the facility first transforms the validation template shown in Table 14 into a syntax tree, a portion of which is shown below in Table 15.

TABLE 15

```
1    [MethodDeclaration] public static String Formula_32(Record record)
2        [IdentifierName] String
3        [ParameterList] (Record record)
4            [Parameter] Record record
5                [IdentifierName] Record
6        [Block]
7            [ReturnStatament]              return        record.GetValue<Decimal?>("MSRP")    –
8    record.GetValue<Decimal?>("Cost")
9                [SubtractExpression]              record.GetValue<Decimal?>("MSRP")          –
10   record.GetValue<Decimal? >("Cost")
11                   [InvocationExpression] record.GetValue<Decimal?>("MSRP")
12                       [SimpleMemerAccessExpression] record.GetValue<Decimal?>
13                           [IdentifierName] record
14                           [GenericName] GetValue<Decimal?>
15                               [TypeArgumentList] <Decimal?>
16                                   [NullableType] Decimal?>
17                                       [IdentifierName] Decimal
18                       [ArgumentList] ("MSRP")
19                           [Argument] "MSRP"
20                               [StringLiteralExpression] "MSRP"
21                   [InvocationExpression] record.GetValue<Decimal?>("Cost")
22                       [SimpleMemberAccessExpression] record.GetValue<Decimal?>
23                           [IdentifierName] record
24                           [GenericName] GetValue<Decimal?>
25                               [TypeArgumentList] <Decimal?>
26                                   [NullableType] Decimal?>
27                                       [IdentifierName] Decimal
28                       [ArumentList] ("Cost")
29                           [Argument] "Cost"
30                               [StringLiteralExpression] "Cost"
```

Validation the second example proceeds as follows from the syntax tree shown in Table 15:

Step 1: [line 1]—From the starting point of the validator, the method declaration bubbles forward to the "yes" branch of "Is Method Declaration". Each parameter is mapped to a valid type and added to a copy of the current contextual mapping which is then pushed onto the contextual stack as the new current context.

Step 2: [lines 3-5]—Processing then moves forward to the recursive "Traverse Each Child Node's Syntax Tree" branch of the flowchart. First among these are the parameters preprocessed in the prior step. These each pass through the "Is Variable Declaration" and pass the "Is Whitelisted Type" check.

Step 3: [line 6]—Upon completion of Step 2, control returns to where Step 1 left off. The remaining child of the method node it its body. As with many of the node types in the code graph, the "Block" representing a method's body is not intercepted for processing so the Roslyn traversal functionality moves on to processing the child nodes which in this case are the programmatic expressions that represent each line of code in the method body.

Step 4: [lines 7-30] The single line of the method body is its return statement. Recursive processing of the return statement's child nodes results in zero whitelist violations, no syntax errors and both of the field paths validate successfully.

Step 5: [lines 10-20] The first node that is evaluated in the code tree of the return statement's body is the whitelisted "GetValue" method call. The method successfully navigates the "Is Whitelisted Method Call" so no error is logged for the invocation. Next, the field path parameter "MSRP is deemed valid from the perspective of the record and is of a type consistent with what it's being cast to (a nullable decimal) so it is added to the list of "visited" field paths at the "Record Method, Field Path and Filter Expression" step (though for "GetValue" calls only the path is needed).

Step 6: [lines 21-30] The next node in the return statement's body is again the whitelisted "GetValue" method and, again, no error is logged for the whitelisted method invocation so its field path is validated next. The path "Cost" checks out, as does its type, thus it is also added to the catalog of "visited" field paths.

Returning to FIG. 2, where, as in the second example discussed above, no errors are produced during validation, the facility continues in act 207. In act 207, the facility constructs a translation template around the formula method received in act 201.

One difference between the validation and translation templates is that the latter is an aggregated representative of all of computed fields for a given component rather than just one. This is an alternative to wrangling a large number of smaller formula kernels and supporting composite types which are often employed together anyway, and lays the foundation for further optimizations.

In some embodiments, a composite projection type is also created in the translation template. For this composite type, a property is generated for each of the following:
Distinct field value accessors.
Unique aggregate calls factoring in optional filtration.
The target field of each formula.
The ID field of the record.

The generation of properties for the field value accessories ("GetValue calls") provides for any direct field value access used by a component's formulas to utilize direct projection at query time rather than load the full tracked record and/or incur a database hit for every step in a multi-part field path for each record that the formula set is being applied to. Furthermore, any duplicated field access either within a formula or across the formulas of a component are all routed to this single consolidated property at translation time. (A piecemeal formula approach, on the other hand, would retrieve this data redundantly for each formula execution.)

In some embodiments, the ID and target field projections are used to facilitate fast, efficient bulk commits to the database that bypass the LINQ ORM layer. In some embodiments, the facility compares the original and new values, and discards the potential commit when the result does not differ. In some embodiments, to support this optimization, the facility retrieves the target field value in addition to the record ID.

Also, properties are generated for the aggregate values in a way very similar to the direct value accessor properties with additional consideration to uniqueness. The aggregate methods on the Record class stub (Average, Sum, Count, Min and Max) are designed to provide constrained aggregation functionality of 1:N relational data. As such, in some embodiments, they are permitted exactly one 1:N step in their source field path after which the aggregation operation is applied to whatever field path fragment lies to the right of that step. An optional filter expression can be provided to provide basic filtration of the target records to cull undesirable values from being included in the aggregation but, as well as the aggregation type, alters the outcome. As such, uniqueness of the projected property must factor in both the aggregation type and filtration.

The collected properties are then used to create a projection class tailored specifically to the component and is injected, along with a small payload of projection metadata, into the formula kernel template. These are also post-processed by the formula engine as formula-property mappings so that partial projections to a subset of the composite projection's properties when it's desirable that only a subset of the kernel formulas need to be applied.

A translation template for the function method of the second example shown in Table 13 is shown below in Table 16.

TABLE 16

```
1    namespace RuntimeFormula
2    {
3        using static System.Math;
4        using DateTime = System.DateTime;
5        using Guid = System.Guid;
6        using String = System.String;
7        using Decimal = System.Decimal;
8
9        using IPAddress = LockPath.Keylight.Utility.IPAddressMk2;
10
11       public sealed class Record
12       {
13           public TResult GetValue<TResult>(string fieldPath)
14           {
15               return (TResult)System.Activator.CreateInstance(typeof(TResult));
16           }
17
18           public TResult Min<TResult>(string fieldPath,
19       System.Linq.Expressions.Expression<System.Func<Record, bool>>
20               subRecordFilter = null)
21           {
22               return (TResult)System.Activator.CreateInstance(typeof(TResult));
```

TABLE 16-continued

```
23        }
24
25        public TResult Max<TResult>(string fieldPath,
26   System.Linq.Expressions.Expression<System.Func<Record, bool>>
27            subRecordFilter = null)
28        {
29           return (TResult)System.Activator.CreateInstance(typeof(TResult));
30        }
31
32        public TResult Average<TResult>(string fieldPath,
33   System.Linq.Expressions.Expression<System.Func<Record,
34            bool>> subRecordFilter = null)
35        {
36   return (TResult)System.Activator.CreateInstance(typeof(TResult));
37        }
38
39        public TResult Sum<TResult>(string fieldPath,
40   System.Linq.Expressions.Expression<System.Func<Record, bool>>
41            subRecordFilter = null)
42        {
43           return (TResult)System.Activator.CreateInstance(typeof(TResult));
44        }
45
46        public TResult Count<TResult>(string fieldPath,
47   System.Linq.Expressions.Expression<System.Func<Record, bool>>
48            subRecordFilter = null)
49        {
50           return (TResult)System.Activator.CreateInstance(typeof(TResult));
51        }
52     }
53
54     public sealed class FormulaWrapper
55     {
56        public static Decimal? Formula_32(Record record)
57        {
58           return record.GetValue<Decimal?>("MSRP") –
59   record.GetValue<Decimal?>("Cost");
60        }
61
62        public static String IdentitySeed(String identityPrefix, int
63   minNumericSeedLength, char
64            char numericSeedPaddingCharacter, String identitySuffix)
65        {
66           return String.Format("{0}\0{1}\0{2}", identityPrefix, new
67   String(numericSeedPaddingCharacter,
68            minNumericSeedLength), identitySuffix);
69        }
70     }
71   }
```

In act 208, the facility constructs a syntax tree from the translation template constructed in act 207. A syntax tree constructed from the translation template for the second example shown in Table 16 is shown below in Table 17.

TABLE 17

```
1   [CompilationUnit]
2      [NamespaceDeclaration]namespace RuntimeFormula
3         [IdentifierName] RuntimeFormula
4         [UsingDirective] using static System.Math;
5            [QualifiedName] System.Math
6               [IdentifierName] System
7               [IdentifierName] Math
8         [UsingDirective] using DateTime = System.DateTime;
9            [NameEquals] DateTime =
10              [IdentifierName] DateTime
11           [QualifiedName] System.DateTime
12              [IdentifierName] System
13              [IdentifierName] DateTime
14        [UsingDirective] using Guid = System.Guid;
15           [NameEquals] Guid =
16              [IdentifierName] Guid
17           [QualifiedName] System.Guid
18              [IdentifierName] System
19              [IdentifierName] Guid
20        [UsingDirective] using String = System.String;
21           [NameEquals] String =
22              [IdentifierName] String
```

TABLE 17-continued

```
23          [QualifiedName] System.String
24             [IdentifierName] System
25             [IdentifierName] String
26       [UsingDirective] using Decimal = System.Decimal;
27          [NameEquals] Decimal =
28             [IdentifierName] Decimal
29          [QualifiedName] System.Decimal
30             [IdentifierName] System
31             [IdentifierName] Decimal
32       [UsingDirective] using IPAddress = LockPath.Keylight.Utility.IPAddressMk2;
33          [NameEquals] IPAddress =
34             [IdentifierName] IPAddress
35          [QualifiedName] LockPath.Keylight.Utility.IPAddressMk2
36             [QualifiedName] LockPath.Keylight.Utility
37                [QualifiedName] LockPath.Keylight
38                   [IdentifierName] LockPath
39                   [IdentifierName] Keylight
40                [IdentifierName] Utility
41             [IdentifierName] IPAddressMk2
42       [ClassDeclaration] public sealed class Record
43          [MethodDeclaration] public TResult GetValue<TResult>(string fieldPath)
44             [IdentifierName] TResult
45             [TypeParameterList] <TResult>
46                [TypeParameter] TResult
47             [ParameterList] (string fieldPath)
48                [Parameter] string fieldPath
49                   [PredefinedType] string
50             [Block]
51                [ReturnStatement] return
52 (TResult)System.Activator.CreateInstance(typeof(TResult));
53                   [CastExpression] (TResult)System.Activator.CreateInstance(typeof(TResult))
54                      [IdentifierName] TResult
55                      [InvocationExpression] System.Activator.CreateInstance(typeof(TResult))
56                         [SimpleMemberAccessExpression] System.Activator.CreateInstance
57                            [SimpleMemberAccessExpression] System.Activator
58                               [IdentifierName] System
59                               [IdentifierName] Activator
60                            [IdentifierName] CreateInstance
61                         [ArgumentList] (typeof(TResult))
62                            [Argument] typeof(TResult)
63                               [TypeOfExpression] typeof(TResult)
64                                  [IdentifierName] TResult
65          [MethodDeclaration] public TResult Min<TResult>(string fieldPath,
66                   System.Linq.Expressions.Expression<System.Func<RecordJ bool>>subRecordFilten
67             = null)
68             [IdentifierName] TResult
69             [TypeParameterList] <TResult>
70                [TypeParameter] TResult
71             [ParameterList] (string fieldPath,
72 System.Linq.Expressions.Expression<System.FuncxRecord, bool>>
73                   subRecordFilter = null)
74                [Parameter] string fieldPath
75                   [PredefinedType] string
76                [Parameter] System.Linq.Expressions.Expression<System.FuncxRecord, bool>>
77 subRecordFilter = null
78                   [QualifiedName] System.Linq.Expressions.Expression<System.Func<Record, bool>>
79                      [QualifiedName] System.Linq.Expressions
80                         [QualifiedName] System.Linq
81                            [IdentifierName] System
82                            [IdentifierName] Linq
83                         [IdentifierName] Expressions
84                      [GenericName] Expression<System.Func<Record, bool>>
85                         [TypeArgumentList] <System.Func<Record, bool>>
86                            [QualifiedName] System.Func<Record, bool>
87                               [IdentifierName] System
88                               [GenericName] Func<Record, bool>
89                                  [TypeArgumentList] <Record, bool>
90                                     [IdentifierName] Record
91                                     [PredefinedType] bool
92                   [EqualsValueClause] = null
93                      [NullLiteralExpression] null
94             [Block]
95                [ReturnStatement] return
96 (TResult)System.Activator.CreateInstance(typeof(TResult));
97                   [CastExpression] (TResult)System.Activator.CreateInstance(typeof(TResult))
98                      [IdentifierName] TResult
99                      [InvocationExpression] System.Activator.CreateInstance(typeof(TResult))
100                        [SimpleMemberAccessExpression] System.Activator.CreateInstance
101                           [SimpleMemberAccessExpression] System.Activator
102                              [IdentifierName] System
```

TABLE 17-continued

```
103                [IdentifierName] Activator
104                [IdentifierName] CreateInstance
105             [ArgumentList] (typeof(TResult))
106                [Argument] typeof(TResult)
107                   [TypeOfExpression] typeof(TResult)
108                      [IdentifierName] TResult
109       [MethodDeclaration] public TResult Max<TResult>(string fieldPath,
110             System.Linq.Expressions.Expression<System.Func<Record, bool>>subRecordFilter
111 = null)
112          [IdentifierName] TResult
113          [TypeParameterList] <TResult>
114             [TypeParameter] TResult
115          [ParameterList] (string fieldPath,
116 System.Linq.Expressions.Expression<System.Func<Record, bool>>
117             subRecordFilter = null)
118             [Parameter] string fieldPath
119                [PredefinedType] string
120             [Parameter] System.Linq.Expressions.Expression<System.Func<Record, bool>>
121 subRecordFilter = null
122                [QualifiedName] System.Linq.Expressions.Expression<System.Func<Record, bool>>
123                   [QualifiedName] System.Linq.Expressions
124                      [QualifiedName] System.Linq
125                         [IdentifierName] System
126                         [IdentifierName] Linq
127                      [IdentifierName] Expressions
128                   [GenericName] Expression<System.Func<Record, bool>>
129                      [TypeArgumentList] <System.Func<Record, bool>>
130                         [QualifiedName] System.Func<Record, bool>
131                            [IdentifierName] System
132                            [GenericName] FuncxRecord, bool>
133                               [TypeArgumentList] <Record, bool>
134                                  [IdentifierName] Record
135                                  [PredefinedType] bool
136                [EqualsValueClause] = null
137                   [NullLiteralExpression] null
138          [Block]
139             [ReturnStatement] return
140 (TResult)System.Activator.CreateInstance(typeof(TResult));
141                [CastExpression] (TResult)System.Activator.CreateInstance(typeof(TResult))
142                   [IdentifierName] TResult
143                   [InvocationExpression] System.Activator.CreateInstance(typeof(TResult))
144                      [SimpleMemberAccessExpression] System.Activator.CreateInstance
145                         [SimpleMemberAccessExpression] System.Activator
146                            [IdentifierName] System
147                            [IdentifierName] Activator
148                         [IdentifierName] CreateInstance
149                      [ArgumentList] (typeof(TResult))
150                         [Argument] typeof(TResult)
151                            [TypeOfExpression] typeof(TResult)
152                               [IdentifierName] TResult
153       [MethodDeclaration] public TResult Average<TResult>(string fieldPath,
154             System.Linq.Expressions.Expression<System.Func<Record, bool>>subRecordFilter
155 = null)
156          [IdentifierName] TResult
157          [TypeParameterList] <TResult>
158             [TypeParameter] TResult
159          [ParameterList] (string fieldPath,
160 System.Linq.Expressions.Expression<System.FuncxRecord, bool>>
161             subRecordFilter = null)
162             [Parameter] string fieldPath
163                [PredefinedType] string
164             [Parameter] System.Linq.Expressions.Expression<System.Func<Record, bool>>
165 subRecordFilter = null
166                [QualifiedName] System.Linq.Expressions.Expression<System.Func<Record, bool>>
167                   [QualifiedName] System.Linq.Expressions
168                      [QualifiedName] System.Linq
169                         [IdentifierName] System
170                         [IdentifierName] Linq
171                      [IdentifierName] Expressions
172                   [GenericName] Expression<System.Func<Record, bool>>
173                      [TypeArgumentList] <System.Func<Record, bool>>
174                         [QualifiedName] System.Func<Record, bool>
175                            [IdentifierName] System
176                            [GenericName] Func<Record, bool>
177                               [TypeArgumentList] <Record, bool>
178                                  [IdentifierName] Record
179                                  [PredefinedType] bool
180                [EqualsValueClause] = null
181                   [NullLiteralExpression] null
182          [Block]
```

TABLE 17-continued

```
183            [ReturnStatement] return
184 (TResult)System.Activator.CreateInstance(typeof(TResult));
185            [CastExpression] (TResult)System.Activator.CreateInstance(typeof(TResult))
186                [IdentifierName] TResult
187                [InvocationExpression] System.Activator.CreateInstance(typeof(TResult))
188                    [SimpleMemberAccessExpression] System.Activator.CreateInstance
189                        [SimpleMemberAccessExpression] System.Activator
190                            [IdentifierName] System
191                            [IdentifierName] Activator
192                        [IdentifierName] CreateInstance
193                    [ArgumentList] (typeof(TResult))
194                        [Argument] typeof(TResult)
195                            [TypeOfExpression] typeof(TResult)
196                                [IdentifierName] TResult
197        [MethodDeclaration] public TResult Sum<TResult>(string fieldPath,
198            System.Linq.Expressions.Expression<System.Func<Record, bool>>subRecordFilter
199            = null)
200            [IdentifierName] TResult
201            [TypeParameterList] <TResult>
202                [TypeParameter] TResult
203            [ParameterList] (string fieldPath,
204 System.Linq.Expressions.Expression<System.Func<Record, bool>>
205                        subRecordFilter = null)
206                [Parameter] string fieldPath
207                    [PredefinedType] string
208                [Parameter] System.Linq.Expressions.Expression<System.Func<Record, bool>>
209 subRecordFilter = null
210                    [QualifiedName] System.Linq.Expressions.Expression<System.Func<Record, bool>>
211                        [QualifiedName] System.Linq.Expressions
212                            [QualifiedName] System.Linq
213                                [IdentifierName] System
214                                [IdentifierName] Linq
215                            [IdentifierName] Expressions
216                        [GenericName] Expression<System.Func<Record, bool>>
217                            [TypeArgumentList] <System.Func<Record, bool>>
218                                [QualifiedName] System.Func<Record, bool>
219                                    [IdentifierName] System
220                                    [GenericName] Func<Record, bool>
221                                        [TypeArgumentList] <Record, bool>
222                                            [IdentifierName] Record
223                                            [PredefinedType] bool
224                    [EqualsValueClause] = null
225                        [NullLiteralExpression] null
226            [Block]
227                [ReturnStatement] return
228 (TResuit)System.Activator.CreateInstance(typeof(TResult));
229            [CastExpression] (TResult)System.Activator,CreateInstance(typeof(TResult))
230                [IdentifierName] TResult
231                [InvocationExpression] System.Activator,CreateInstance(typeof(TResult))
232                    [SimpleMemberAccessExpression] System.Activator.CreateInstance
233                        [SimpleMemberAccessExpression] System.Activator
234                            [IdentifierName] System
235                            [IdentifierName] Activator
236                        [IdentifierName] CreateInstance
237                    [ArgumentList] (typeof(TResult))
238                        [Argument] typeof(TResult)
239                            [TypeOfExpression] typeof(TResult)
240                                [IdentifierName] TResult
241        [MethodDeclaration] public TResult Count<TResult>(string fieldPath,
242            System.Linq.Expressions.Expression<System.Func<Record, bool>>subRecordFilter
243            = null)
244            [IdentifierName] TResult
245            [TypeParameterList] <TResult>
246                [TypeParameter] TResult
247            [ParameterList] (string fieldPath,
248 System.Linq.Expressions.Expression<System.FuncxRecord, bool>>
249                        subRecordFilter = null)
250                [Parameter] string fieldPath
251                    [PredefinedType] string
252                [Parameter] System.Linq.Expressions.Expression<System.Func<Record, bool>>
253 subRecordFilter = null
254                    [QualifiedName] System.Linq.Expressions.Expression<System.Func<Record, bool>>
255                        [QualifiedName] System.Linq.Expressions
256                            [QualifiedName] System.Linq
257                                [IdentifierName] System
258                                [IdentifierName] Linq
259                            [IdentifierName] Expressions
260                        [GenericName] Expression<System.Func<Record, bool>>
261                            [TypeArgumentList] <System.Func<Record, bool>>
262                                [QualifiedName] System.Func<Record, bool>
```

TABLE 17-continued

```
263                [IdentifierName] System
264                [GenericName] Func<Record, bool>
265                   [TypeArgumentList] <Record, bool>
266                      [IdentifierName] Record
267                      [PredefinedType] bool
268             [EqualsValueClause] = null
269                [NullLiteralExpression] null
270          [Block]
271             [ReturnStatement] return
272 (TResult)System.Activator.CreateInstance(typeof(TResult));
273                [CastExpression] (TResult)System.Activator.CreateInstance(typeof(TResult))
274                   [IdentifierName] TResult
275                   [InvocationExpression] System.Activator.CreateInstance(typeof(TResult))
276                      [SimpleMemberAccessExpression] System.Activator.CreateInstance
277                         [SimpleMemberAccessExpression] System.Activator
278                            [IdentifierName] System
279                            [IdentifierName] Activator
280                         [IdentifierName] CreateInstance
281                      [ArgumentList] (typeof(TResult))
282                         [Argument] typeof(TResult)
283                            [TypeOfExpression] typeof(TResult)
284                               [IdentifierName] TResult
285    [ClassDeclaration] public sealed class FormulaWrapper
286       [MethodDeclaration] public static Decimal? Formula_32(Record record)
287          [NullableType] Decimal?
288             [IdentifierName] Decimal
289          [ParameterList] (Record record)
290             [Parameter] Record record
291                [IdentifierName] Record
292          [Block]
293             [ReturnStatement] return record.GetValue<Decimal?>("MSRP") -
294 record.GetValue<Decimal?>("Cost");
295                [SubtractExpression] record.GetValue<Decimal?>("MSRP") -
296 record.GetValue<Decimal?>("Cost")
297                   [InvocationExpression] record.GetValue<Decimal?>("MSRP")
298                      [SimpleMemberAccessExpression] record.GetValue<Decimal?>
299                         [IdentifierName] record
300                         [GenericName] GetValue<Decimal?>
301                            [TypeArgumentList] <Decimal?>
302                               [NullableType] Decimal?
303                                  [IdentifierName] Decimal
304                      [ArgumentList] ("MSRP")
305                         [Argument] "MSRP"
306                            [StringLiteralExpression] "MSRP"
307                   [InvocationExpression] record.GetValue<Decimal?>("Cost")
308                      [SimpleMemberAccessExpression] record.GetValue<Decimal?>
309                         [IdentifierName] record
310                         [GenericName] GetValue<Decimal?>
311                            [TypeArgumentList] <Decimal?>
312                               [NullableType] Decimal?
313                                  [IdentifierName] Decimal
314                      [ArgumentList] ("Cost")
315                         [Argument] "Cost"
316                            [StringLiteralExpression] "Cost"
317       [MethodDeclaration] public static String IdentitySeed(String identityPrefix, int
318 minNumericSeedLength, char
319              numericSeedPaddingCharacter, String identitySuffix)
320          [IdentifierName] String
32}          [ParameterList] (String identityPrefix, int minNumericSeedLength, char
322 numericSeedPaddingCharacter, String
323              identitySuffix)
324             [Parameter] String identityPrefix
325                [IdentifierName] String
326             [Parameter] int minNumericSeedLength
327                [PredefinedType] int
328             [Parameter] char numericSeedPaddingCharacter
329                [PredefinedType] char
330             [Parameter] String identitySuffix
331                [IdentifierName] String
332          [Block]
333             [ReturnStatement] return String.Format("{0}\0{1}\0{2}", identityPrefix, new
334 String(numericSeedPaddingCharacter,
335              minNumericSeedLength), identitySuffix);
336                [InvocationExpression] String.Format("{0}\0{1}\0{2}", identityPrefix, new
337 String(numericSeedPaddingCharacter,
338              minNumericSeedLength), identitySuffix)
339                   [SimpleMemberAccessExpression] String.Format
340                      [IdentifierName] String
341                      [IdentifierName] Format
342                   [ArgumentList] ("{0}\0{1}\0{2}", identityPrefix, new
```

TABLE 17-continued

```
343 String(numericSeedPaddingCharacter,
344                     minNumericSeedLength), identitySuffix)
345             [Argument] "{0}\0{1}\0{2}"
346                 [StringLiteralExpression; "{0}\0{1}\0{2}"
347             [Argument] identityPrefix
348                 [IdentifierName] identityPrefix
349             [Argument] new String(numericSeedPaddingCharacter, minNumericSeedLength)
350                 [ObjectCreationExpression] new String(numericSeedPaddingCharacter,
351 minNumericSeedLength)
352                     [IdentifierName] String
353                         [ArgumentList] (numericSeedPaddingCharacter, minNumericSeedLength)
354                             [Argument] numericSeedPaddingCharacter
355 [IdentifierName] numericSeedPaddingCharacter
356                             [Argument] minNumericSeedLength
357                                 [IdentifierName] minNumericSeedLength
358             [Argument] identitySuffix
359                 [IdentifierName] identitySuffix
```

In act 209, the facility translates the syntax tree constructed in act 208, which can include, for example, adding notes to the syntax tree; deleting notes from the syntax tree and/or modifying nodes in the syntax tree. During translation, the facility translates references to the stub record class and associated method calls into the to-be-created projection class and its relevant value accessors. The method representing the field's formula is also given a unique name and the necessary namespace references are added. Lastly, the projection class representing all of the fields referenced by the formula is generated along with a collection of metadata to assist with mapping database results at a later stage.

Figure 4:
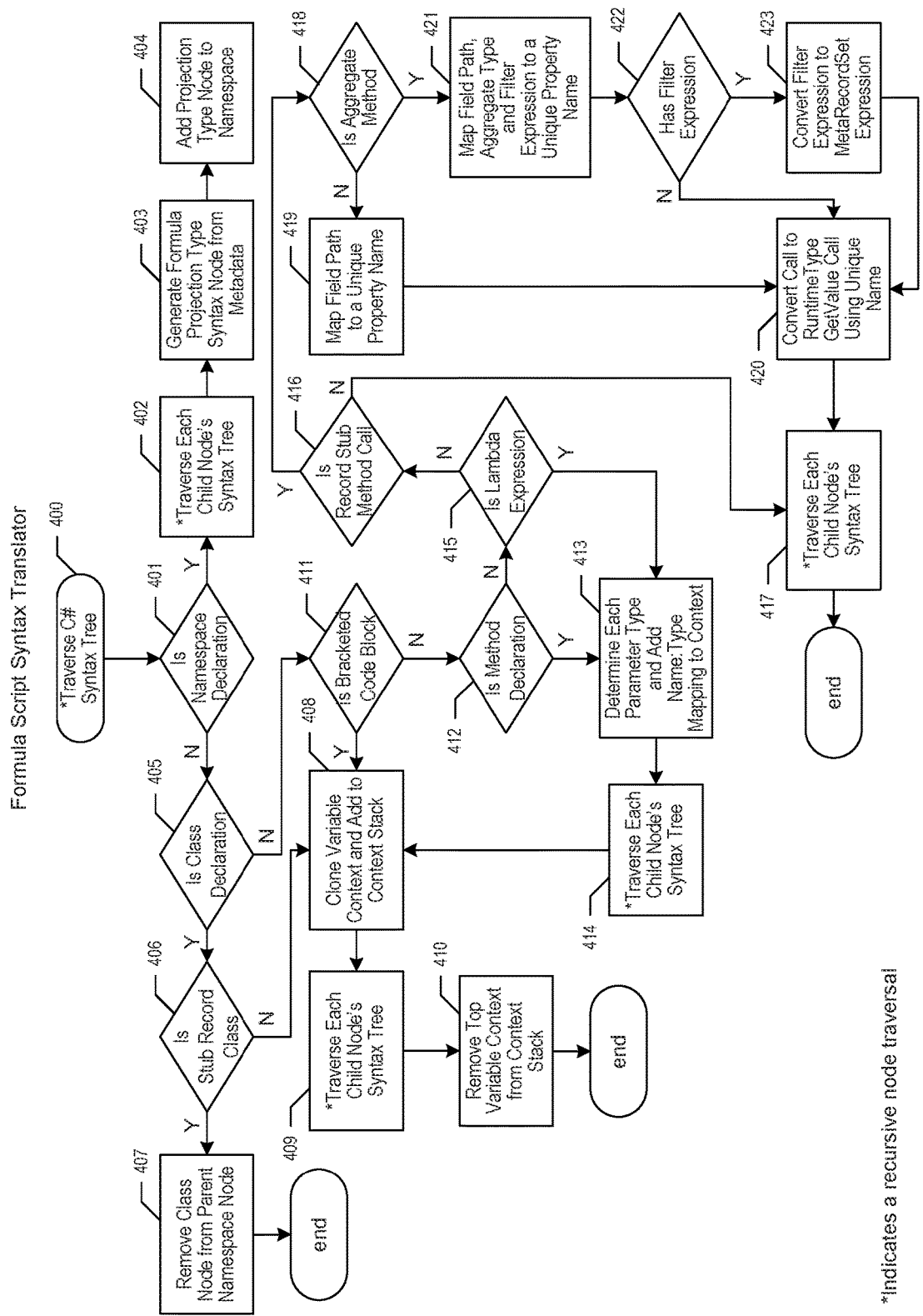
FIG. 4 is a flow diagram showing a process performed by the facility in some embodiments to perform translation of the formula method.

FIG. 4 is a flow diagram showing a process performed by the facility in some embodiments to perform translation of the formula method. The process 400 is called with respect to a particular node of the syntax tree generated from the translation template. Initially, this is the root of the syntax tree—the node shown in line 1 of the sample syntax tree shown in Table 17. The process recursively calls itself in order to traverse from the present node to another node, as part of traversing some or all of the syntax tree across all of the cost of the process. In the flow diagram, acts that recursively call the process are preceded with an asterisk: acts 402, 409, 414, and 417.

In act 401, if the node is a namespace declaration, then the facility continues in act 402, else the facility continues in act 405. In act 402, the facility recursively calls the process to traverse each of the node's children. In act 403, the facility generates a formula projection type syntax node from metadata. In act 404, the facility adds the projection type node generated in act 403 to the namespace. After act 404, the process ends/returns.

In act 405, if the node is a class declaration, then the facility continues in act 406, else the facility continues in act 411. In act 406, if the node is a stub record class, then the facility continues in act 407, else the facility continues in act 408. In act 407, the facility removes the class node from the parent namespace node. After act 407, the process ends/returns.

In act 408, the facility clones the variable context and adds the cloned variable context to the context stack. In act 409, the facility recursively calls the process to traverse each of the node's children. In act 410, the facility removes the top variable context from the context stack. After act 410, the process ends/returns.

In act 411, if the node is a bracketed code block, then the facility continues in act 408, else the facility continues in act 412. In act 412, if the note is a method declaration, then the facility continues in act 413, else the facility continues in act 415. In act 413, for each parameter, the facility determines the parameter's type and adds a corresponding parameter name:type mapping to the context. In act 414, the facility recursively calls the process to traverse each of the node's children. After act 414, the facility continues in act 408.

In act 415, if the node is a lambda expression, then the facility continues in act 413, else the facility continues in act 416. In act 416, if the node is a record stub method call, then the facility continues in act 418, else the facility continues in act 417. In act 417, the facility recursively calls the process to traverse each of the node's children. After act 417, the process ends/returns.

In act 418, if the node is an aggregate method, then the facility continues in act 421, else the facility continues in act 419. In act 419, the facility maps the field path of the aggregate method to a unique property name. In act 420, the facility converts the aggregate method call to a runtime type GetValue call using the unique property name assigned in act 419. After act 420, the facility continues in act 417

In act 421, the facility maps the field path aggregate type, and filter expression to a unique property name. In act 422, if the aggregate method node has a filter expression, then the facility continues in act 423, else the facility continues in act 420. In act 423, the facility converts the filter expression to a MetaRecordSet expression. After act 423, the facility continues in act 420.

The facility performs the translation of the syntax tree shown in Table 17 as follows. Despite the simplicity of the example and the code that wraps it, the resulting syntax tree is quite large. In favor of brevity, the focus will largely be on "nodes of interest", i.e. those that involve some degree of transformation or processing as they relate to the translation process shown in FIG. 4.

Step 1: [lines 1-2]—Beginning from the code document root results in a direct traversal to the namespace node which encapsulates the classes defined for the formula's execution space. The data gathered while traversing and translating the child class nodes is used to create the projection class which will be added to the namespace node's children.

Step 2: [lines 42-284]—The "Record" class is identified by name as the discardable stub class by the "Is Stub Record Class" check thus this node and its children are culled from the parent namespace node since all references to it are destined to be replaced by the projection class in the following translation steps.

Step 3: [lines 285-359]—"FormulaWrapper" is the designated name of the class that harbors the unified collection of formula methods for a given component. These methods are iteratively translated and for use in recomposing a new FormulaWrapper class.

Step 4: [lines 286-316]—Because of the "Formula_" prefix, the "Formula_32" method is identified by the "Is Method Declaration" step as a formula method. In preparation for its ultimate translation, the parameter list, in this case a single Record parameter, is iteratively inspected and a type mapping is registered for each element by the "Determine Each Parameter Type and Add Name:Type Mapping to Context" stage. Via the subsequent "Convert Stub Record Parameters to RuntimeType" step, any parameter references to the "Record" class are converted to the "FormulaType" projection class that will be created at a later step. Lastly the method body is processed.

Step 5: [lines 292-316]—The "Is Bracketed Code Block" branch is taken upon encountering the body node and a new clone of the type mapping context is created. The code lines that comprise the body are then iterated over.

Step 6: [lines 297-306]—The first node to be intercepted by the method body traversal is the record.GetValue<Decimal?>("MSRP") invocation as it is identified by the "Is Record Stub Method Call" branch as such. Since it is not subsequently cataloged as an aggregate call in the subsequent check, the field path is extracted, the type is identified and, if not already cached, the metadata is granted a unique name and added to the cache. Finally, the node representing a GetValue accessor for the stub record class is replaced by a property accessor expression to the pending projection class via the generated unique name.

Step 7: [lines 307-316]—The next node to be intercepted in the method body traversal is the record.GetValue<Decimal?>("Cost") invocation. As in Step 6, the field path is extracted, its type evaluated, and it is mapped to a unique name for use in generating the projection class. Likewise the node is replaced by the matching property accessor for the projection class.

Step 8: [line 286]—Control returns to the method translation handler (Step 4) upon completion of the method body translation and a new method reflecting the updated parameter list and body is created to replace the formula method.

Step 9: [lines 317-359]—The stub method name "IdentitySeed" does not begin with the "Formula_" hint and is therefore bypassed. (In the future the facility cull this but currently it's left as-is.)

Step 10: [line 285]—With no more methods to process, control percolates back up to the class translation handler (Step 3). A new class is rerolled around the translated formula methods to replace the existing class node.

Step 11: [line 2]—Having translated the formula wrapper class, control bubbles up yet again to the namespace node. Using the collected metadata, a new projection class node is created with properties reflecting the record identity, each field populated by a formula and properties for each of the identified field paths referenced by all of the formula methods. The projection metadata is also folded into this class. Lastly, the namespace node is reincarnated around the translated formula wrapper class and the newly minted projection class.

The translation discussed above produces a translated syntax tree shown below Table 18.

TABLE 18

| | |
|---|---|
| 1 | [CompilationUnit] |
| 2 |    [NamespaceDeclaration] namespace RuntimeFormula |
| 3 |       [IdentifierName] RuntimeFormula |
| 4 |       [UsingDirective] using static System.Math; |
| 5 |          [QualifiedName] System.Math |
| 6 |             [IdentifierName] System |
| 7 |             [IdentifierName] Math |
| 8 |       [UsingDirective] using DateTime = System.DateTime; |
| 9 |          [NameEquals] DateTime = |
| 10 |             [IdentifierName] DateTime |
| 11 |          [QualifiedName] System.DateTime |
| 12 |             [IdentifierName] System |
| 13 |             [IdentifierName] DateTime |
| 14 |       [UsingDirective] using Guid = System.Guid; |
| 15 |          [NameEquals] Guid = |
| 16 |             [IdentifierName] Guid |
| 17 |          [QualifiedName] System.Guid |
| 18 |             [IdentifierName] System |
| 19 |             [IdentifierName] Guid |
| 20 |       [UsingDirective] using String = System.String; |
| 21 |          [NameEquals] String = |
| 22 |             [IdentifierName] String |
| 23 |          [QualifiedName] System.String |
| 24 |             [IdentifierName] System |
| 25 |             [IdentifierName] String |
| 26 |       [UsingDirective] using Decimal = System.Decimal; |
| 27 |          [NameEquals] Decimal = |
| 28 |             [IdentifierName] Decimal |
| 29 |          [QualifiedName] System.Decimal |
| 30 |             [IdentifierName] System |
| 31 |             [IdentifierName] Decimal |
| 32 |       [UsingDirective] using IPAddress = LockPath.Keylight.Utility.IPAddressMk2; |
| 33 |          [NameEquals] IPAddress = |
| 34 |             [IdentifierName] IPAddress |
| 35 |          [QualifiedName] LockPath.Keylight.Utility.IPAddressMk2 |
| 36 |             [QualifiedName] LockPath.Keylight.Utility |
| 37 |                [QualifiedName] LockPath.Keylight |
| 38 |                   [IdentifierName] LockPath |
| 39 |                   [IdentifierName] Keylight |
| 40 |                [IdentifierName] Utility |
| 41 |             [IdentifierName] IPAddressMk2 |

TABLE 18-continued

```
42      [ClassDeclaration] public sealed class FormulaWrapper
43          [MethodDeclaration] public static Decimal?
44 Formula_32(LockPath.Keylight.Data.LUMA.RuntimeType record)
45              [NullableType] Decimal?
46                  [IdentifierName] Decimal
47              [ParameterList] (LockPath.Keylight.Data.LUMA.RuntimeType record)
48                  [Parameter] LockPath.Keylight.Data.LUMA.RuntimeType record
49                      [QualifiedName] LockPath.Keylight.Data.LUMA.RuntimeType
50                          [QualifiedName] LockPath.Keylight.Data.LUMA
51                              [QualifiedName] LockPath.Keylight.Data
52                                  [QualifiedName] LockPath.Keylight
53                                      [IdentifierName] LockPath
54                                      [IdentifierName] Keylight
55                                  [IdentifierName] Data
56                              [IdentifierName] LUMA
57                          [IdentifierName] RuntimeType
58              [Block]
59                  [ReturnStatement] return ((Decimal?)record.GetValue("Field_3451369357"))-
60                      ((Decimal?)record.GetValue("Field_3452614551"));
61                      [SubtractExpression] ((Decimal?)record.GetValue("Field_3451369357"))-
62                          ((Decimal?)record.GetValue("Field_3452614551"))
63                          [ParenthesizedExpression] ((Decimal?)record.GetValue("Field_3451369357"))
64                              [CastExpression] (Decimal?)record.GetValue("Field_3451369357")
65                                  [NullableType] Decimal?
66                                      [IdentifierName] Decimal
67                                  [InvocationExpression] record.GetValue("Field_3451369357")
68                                      [SimpleMemberAccessExpression] record .GetValue
69                                          [IdentifierName] record
70                                          [IdentifierName] GetValue
71                                      [ArgumentList] ("Field_3451369357")
72                                          [Argument] "Field_3451369357"
73                                              [StringLiteralExpression] "Field_3451369357"
74                          [ParenthesizedExpression] ((Decimal?)record.GetValue("Field_3452614551"))
75                              [CastExpression] (Decimal?)record.GetValue("Field_3452614551")
76                                  [NullableType] Decimal?
77                                      [IdentifierName] Decimal
78                                  [InvocationExpression] record.GetValue("Field_3452614551")
79                                      [SimpleMemberAccessExpression] record .GetValue
80                                          [IdentifierName] record
81                                          [IdentifierName] GetValue
82                                      [ArgumentList] ("Field_3452614551")
83                                          [Argument] "Field_3452614551"
84                                              [StringLiteralExpression] "Field_3452614551"
85          [MethodDeclaration] public static String IdentitySeed(String identityPrefix, int
86 minNumericSeedLength,
87              char numericSeedPaddingCharacter, String identitySuffix)
88              [IdentifierName] String
89              [ParameterList] (String identityPrefix, int minNumericSeedLength, char
90 numericSeedPaddingCharacter,
91                  String identitySuffix)
92                  [Parameter] String identityPrefix
93                      [IdentifierName] String
94                  [Parameter] int minNumericSeedLength
95                      [PredefinedType] int
96                  [Parameter] char numericSeedPaddingCharacter
97                      [PredefinedType] char
98                  [Parameter] String identitySuffix
99                      [IdentifierName] String
100             [Block]
101                 [ReturnStatement] return String.Format("{0}\0{1}\0{2}", identityPrefix, new
102 String(numericSeedPaddingCharacter,
103                     minNumericSeedLength), identitySuffix);
104                     [InvocationExpression] String.Format("{0}\0{1}\0{2}", identityPrefix, new
105 String(numericSeedPaddingCharacter,
106                         minNumericSeedLength), identitySuffix)
107                         [SimpleMemberAccessExpression] String.Format
108                             [IdentifierName] String
109                             [IdentifierName] Format
110                         [ArgumentList] ("{0}\0{1}\0{2}", identityPrefix, new
111 String(numericSeedPaddingCharacter,
112                             minNumericSeedLength), identitySuffix)
113                             [Argument] "{0}\0{1}\0{2}"
114                                 [StringLiteralExpression] "{0}\0{1}\0{2}"
115                             [Argument] identityPrefix
116                                 [IdentifierName] identityPrefix
117                             [Argument] new String(numericSeedPaddingCharacter, minNumericSeedLength)
118                                 [ObjectCreationExpression] new String(numericSeedPaddingCharacter,
119 minNumericSeedLength)
120                                     [IdentifierName] String
121                                     [ArgumentList] (numericSeedPaddingCharacter, minNumericSeedLength)
```

TABLE 18-continued

```
122                    [Argument] numericSeedPaddingCharacter
123                       [IdentifierName] numericSeedPaddingCharacter
124                    [Argument] minNumericSeedLength
125                       [IdentifierName] minNumericSeedLength
126                    [Argument] identitySuffix
127                       [IdentifierName] identitySuffix
128         [ClassDeclaration]
129            [BaseList] :LockPath.Keylight.Data.LUMA.RuntimeType
130               [SimpleBaseType] LockPath.Keylight.Data.LUMA.RuntimeType
131                  [QualifiedName] LockPath.Keylight.Data.LUMA.RuntimeType
132                     [QualifiedName] LockPath.Keylight.Data.LUMA
133                        [QualifiedName] LockPath.Keylight.Data
134                           [QualifiedName] LockPath.Keylight
135                              [IdentifierName] LockPath
136                              [IdentifierName] Keylight
137                           [IdentifierName] Data
138                        [IdentifierName] LUMA
139                     [IdentifierName] RuntimeType
140            [FieldDeclaration] privateint_Field_3074643751;
141               [VariableDeclaration] int_Field_3074643751
142                  [PredefinedType] int
143                  [VariableDeclarator] _Field_3074643751
144            [PropertyDeclaration]
145 publicintField_3074643751{get{return_Field_3074643751;}setLField_3074643751=value;}}
146               [PredefinedType] int
147               [AccessorList] {get{return_Field_3074643751;}setLField_3074643751=value;}}
148                  [GetAccessorDeclaration] get{return_Field_3074643751;}
149                     [Block]
150                        [ReturnStatement] return_Field_3074643751;
151                           [IdentifierName] _Field_3074643751
152                  [SetAccessorDeclaration] set{_Field_3074643751=value;}}
153                     [Block]
154                        [ExpressionStatement] _Field_3074643751=value;
155                           [SimpleAssignmentExpression] _Field_3074643751=value
156                              [IdentifierName] _Field_3074643751
157                              [IdentifierName] value
158            [FieldDeclaration] privateDecimal?_Field_3451369357;
159               [VariableDeclaration] Decimal?_Field_3451369357
160                  [NullableType] Decimal?
161                     [IdentifierName] Decimal
162                  [VariableDeclarator] _Field_3451369357
163            [PropertyDeclaration]
164 publicDecimal?Field_3451369357{get{return_Field_3451369357;}setLField_3451369357=value;}}
165               [NullableType] Decimal?
166                  [IdentifierName] Decimal
167               [AccessorList] {get{return_Field_3451369357;}set{_Field_3451369357=value;}}
168                  [GetAccessorDeclaration] get{return_Field_3451369357;}
169                     [Block]
170                        [ReturnStatement] return_Field_3451369357;
171                           [IdentifierName] _Field_3451369357
172                  [SetAccessorDeclaration] set{_Field_3451369357=value; }}
173                     [Block]
174                        [ExpressionStatement] _Field_3451369357=value;
175                           [SimpleAssignmentExpression] _Field_3451369357=value
176                              [IdentifierName] _Field_3451369357
177                              [IdentifierName] value
178            [FieldDeclaration] privateDecimal?_Field_3452614551;
179               [VariableDeclaration] Decimal?_Field_3452614551
180                  [NullableType] Decimal?
181                     [IdentifierName] Decimal
182                  [VariableDeclarator] _Field_3452614551
183            [PropertyDeclaration]
184 publicDecimal?Field_3452614551{get{return_Field_3452614551;}set{_Field_3452614551=value;}}
185               [NullableType] Decimal?
186                  [IdentifierName] Decimal
187               [AccessorList] {get{return_Field_3452614551;}set{_Field_3452614551=value;}}
188                  [GetAccessorDeclaration] get{return_Field_3452614551;}
189                     [Block]
190                        [ReturnStatement] return_Field_3452614551;
191                           [IdentifierName] _Field_3452614551
192                  [SetAccessorDeclaration] set{_Field_3452614551=value;}}
193                     [Block]
194                        [ExpressionStatement] _Field_3452614551=value;
195                           [SimpleAssignmentExpression] _Field_3452614551=value
196                              [IdentifierName] _Field_3452614551
197                              [IdentifierName] value
198 [FieldDeclaration] privateDecimal?_Field_3485366712
199               [VariableDeclaration] Decimal?_Field_3485366712
200                  [NullableType] Decimal?
201                     [IdentifierName] Decimal
```

TABLE 18-continued

```
202            [VariableDeclarator] _Field_3485366712
203            [PropertyDeclaration] publicDecimal?Field_3485366712{get{return
204 _Field_3485366712;}set{_Field_3485366712=value;}}
205              [NullableType] Decimal?
206              [IdentifierName] Decimal
207              [AccessorList] {get{return _Field_3485366712;}set{_Field_3485366712=value;}}
208                [GetAccessorDeclaration] get{return _Field_3485366712;}
209                  [Block]
210                    [ReturnStatement] return _Field_3485366712;
211                      [IdentifierName] _Field_3485366712
212                [SetAccessorDeclaration] set{_Field_3485366712=value;}}
213                  [Block]
214                    [ExpressionStatement] _Field_3485366712=value;
215                      [SimpleAssignmentExpression] _Field_3485366712=value
216                        [IdentifierName] _Field_3485366712
217                        [IdentifierName] value
218        [FieldDeclaration] public static LockPath.Keylight.Data.LUMA.CAFFEINE.ProjectionInfo[ ]
219          [VariableDeclaration] LockPath.Keylight.Data.LUMA.CAFFEINE.ProjectionInfo[ ]
220 PropertyProjectionInfo
221            [ArrayType] LockPath.Keylight.Data.LUMA.CAFFEINE.ProjectionInfo[ ]
222              [QualifiedName] LockPath.Keylight.Data.LUMA.CAFFEINE.ProjectionInfo
223                [QualifiedName] LockPath.Keylight.Data.LUMA.CAFFEINE
224                  [QualifiedName] LockPath.Keylight.Data.LUMA
225                    [QualifiedName] LockPath.Keylight.Data
226                      [QualifiedName] LockPath.Keylight
227                        [IdentifierName] LockPath
228                        [IdentifierName] Keylight
229                      [IdentifierName] Data
230                    [IdentifierName] LUMA
231                  [IdentifierName] CAFFEINE
232                [IdentifierName] ProjectionInfo
233              [ArrayRankSpecifier] [ ]
234                [OmittedArraySizeExpression]
235            [VariableDeclarator] PropertyProjectionInfo = new
236 LockPath.Keylight.Data.LUMA.CAFFEINE.ProjectionInfo
237              [EqualsValueClause] = new LockPath.Keylight.Data.LUMA.CAFFEINE.ProjectionInfo[ ]
238                [ArrayCreationExpression] new
239 LockPath.Keylight.Data.LUMA.CAFFEINE.ProjectionInfo[ ]
240                  [ArrayType] LockPath.Keylight.Data.LUMA.CAFFEINE.ProjectionInfo[ ]
241                    [QualifiedName] LockPath.Keylight.Data.LUMA.CAFFEINE.ProjectionInfo
242                      [QualifiedName] LockPath.Keylight.Data.LUMA.CAFFEINE
243                        [QualifiedName] LockPath.Keylight.Data.LUMA
244                          [QualifiedName] LockPath.Keylight.Data
245                            [QualifiedName] LockPath.Keylight
246                              [IdentifierName] LockPath
247                              [IdentifierName] Keylight
248                            [IdentifierName] Data
249                          [IdentifierName] LUMA
250                        [IdentifierName] CAFFEINE
251                      [IdentifierName] ProjectionInfo
252                    [ArrayRankSpecifier] [ ]
253                      [OmittedArraySizeExpression]
254                  [ArrayInitializerExpression] { }
255                    [ObjectCreationExpression] new
256 LockPath.Keylight.Data.LUMA.CAFFEINE.ProjectionInfo(
257                      newint[ ]{32}, "Field_3451369357",newLockPath.Keylight.Data.FieldPath(33))
258                      [QualifiedName] LockPath.Keylight.Data.LUMA.CAFFEINE.ProjectionInfo
259                        [QualifiedName] LockPath.Keylight.Data.LUMA.CAFFEINE
260                          [QualifiedName] LockPath.Keylight.Data.LUMA
261                            [QualifiedName] LockPath.Keylight.Data
262                              [QualifiedName] LockPath.Keylight
263                                [IdentifierName] LockPath
264                                [IdentifierName] Keylight
265                              [IdentifierName] Data
266                            [IdentifierName] LUMA
267                          [IdentifierName] CAFFEINE
268                        [IdentifierName] ProjectionInfo
269                      [ArgumentList] (new
270 int[ ]{32}, "Field_3451369357",newLockPath.Keylight.Data.FieldPath(33))
271                        [Argument] newint[ ]{32}
272                          [ArrayCreationExpression] newint [ ]{32}
273                            [ArrayType] int[ ]
274                              [PredefinedType] int
275                              [ArrayRankSpecifier] [ ]
276                                [OmittedArraySizeExpression]
277                            [ArrayInitializerExpression] {32}
278                              [NumericLiteralExpression] 32
279                        [Argument] "Field_3451369357"
280                          [StringLiteralExpression] "Field_3451369357"
281                        [Argument] newLockPath.Keylight.Data.FieldPath(33)
```

TABLE 18-continued

| | |
|---|---|
| 282 | [ObjectCreationExpression] newLockPath.Keylight.Data.FieldPath(33) |
| 283 | [QualifiedName] LockPath.Keylight.Data.FieldPath |
| 284 | [QualifiedName] LockPath.Keylight.Data |
| 285 | [QualifiedName] LockPath Keylight |
| 286 | [IdentifierName] LockPath |
| 287 | [IdentifierName] Keylight |
| 288 | [IdentifierName] Data |
| 289 | [IdentifierName] FieldPath |
| 290 | [ArgumentList] (33) |
| 291 | [Argument] 33 |
| 292 | [NumericLiteralExpression] 33 |
| 293 | [ObjectCreationExpression] new |
| 294 | LockPath.Keylight.Data.LUMA.CAFFEINE.ProjectionInfo( |
| 295 | new int [ ] {32}, "Field_3452614551",newLockPath.Keylight.Data.FieldPath(9)) |
| 296 | [QualifiedName] LockPath.Keylight.Data.LUMA.CAFFEINE.ProjectionInfo |
| 297 | [QualifiedName] LockPath.Keylight.Data.LUMA.CAFFEINE |
| 298 | [QualifiedName] LockPath.Keylight.Data.LUMA |
| 299 | [QualifiedName] LockPath.Keylight.Data |
| 300 | [QualifiedName] LockPath Keylight |
| 301 | [IdentifierName] LockPath |
| 302 | [IdentifierName] Keylight |
| 303 | [IdentifierName] Data |
| 304 | [IdentifierName] LUMA |
| 305 | [IdentifierName] CAFFEINE |
| 306 | [IdentifierName] ProjectionInfo |
| 307 | [ArgumentList] |
| 308 | (newint [ ] {32}, "Field_3452614551",newLockPath.Keylight.Data.FieldPath(9)) |
| 309 | [Argument] newint [ ]{32} |
| 310 | [ArrayCreationExpression] newint [ ]{32} |
| 311 | [ArrayType] int [ ] |
| 312 | [PredefinedType] int |
| 313 | [ArrayRankSpecifier] [ ] |
| 314 | [OmittedArraySizeExpression] |
| 315 | [ArrayInitializerExpression] {32} |
| 316 | [NumericLiteralExpression] 32 |
| 317 | [Argument] "Field_3452614551" |
| 318 | [StringLiteralExpression] "Field_3452614551" |
| 319 | [Argument] newLockPath.Keylight.Data.FieldPath(9) |
| 320 | [ObjectCreationExpression] newLockPath.Keylight.Data.FieldPath(9) |
| 321 | [QualifiedName] LockPath.Keylight.Data.FieldPath |
| 322 | [QualifiedName] LockPath.Keylight.Data |
| 323 | [QualifiedName] LockPath Keylight |
| 324 | [IdentifierName] LockPath |
| 325 | [IdentifierName] Keylight |
| 326 | [IdentifierName] Data |
| 327 | [IdentifierName] FieldPath |
| 328 | [ArgumentList] (9) |
| 329 | [Argument] 9 |
| 330 | [NumericLiteralExpression] 9 |
| 331 | [ConstructorDeclaration] public FormulaType( ) |
| 332 | [ParameterList] |
| 333 | [Parameter] int Field_3074643751 |
| 334 | [PredefinedType] int |
| 335 | [Parameter] StringField_3485366712 |
| 336 | [IdentifierName] String |
| 337 | [Parameter] Decimal?Field_3451369357 |
| 338 | [NullableType] Decimal? |
| 339 | [IdentifierName] Decimal |
| 340 | [Parameter] Decimal?Field_3452614551 |
| 341 | [NullableType] Decimal? |
| 342 | [IdentifierName] Decimal |
| 343 | [Block] |
| 344 | [ExpressionStatement] _Field_3074643751=Field_3074643751; |
| 345 | [SimpleAssignmentExpression] _Field_3074643751=Field_3074643751 |
| 346 | [IdentifierName] _Field_3074643751 |
| 347 | [IdentifierName] Field_3074643751 |
| 348 | [ExpressionStatement] _Field_3485366712=Field_3485366712; |
| 349 | [SimpleAssignmentExpression] _Field_3485366712=Field_3485366712 |
| 350 | [IdentifierName] _Field_3485366712 |
| 351 | [IdentifierName] Field_3485366712 |
| 352 | [ExpressionStatement] _Field_3451369357=Field_3451369357; |
| 353 | [SimpleAssignmentExpression] _Field_3451369357=Field_3451369357 |
| 354 | [IdentifierName] _Field_3451369357 |
| 355 | [IdentifierName] Field_3451369357 |
| 356 | [ExpressionStatement] _Field_3452614551=Field_3452614551; |
| 357 | [SimpleAssignmentExpression] _Field_3452614551=Field_3452614551 |

TABLE 18-continued

| 358 | [IdentifierName] _Field_3452614551 |
| 359 | [IdentifierName] Field_3452614551 |

Returning to FIG. 2, in act 210, the facility converts the translated syntax tree produced in act 209 into a transformed formula method. Table 19 below shows the transformed formula method produced by the facility for the second example based on the translated syntax tree shown in Table 18.

TABLE 19

```
1  namespace RuntimeFormula
2  {
3    using static System.Math;
4    using DateTime = System.DateTime;
5    using Guid = System.Guid;
6    using String = System.String;
7    using Decimal = System.Decimal;
8    //using Record = LockPath.Keylight.Data.LUMA.LUMARecord;
9    using IPAddress = LockPath.Keylight.Utility.IPAddressMk2;
10
11   public sealed class FormulaWrapper
12   {
13     public static Decimal? Formula_32(LockPath.Keylight.Data.LUMA.RuntimeType
14 record)
15     {
16       return ((Decimal?)record.GetValue("Field_3451369357")) -
17           ((Decimal?)record.GetValue("Field_3452614551"));
18     }
19
20     public static String IdentitySeed(String identityPrefix, int
21 minNumericSeedLength,
22         char numericSeedPaddingCharacter, String identitySuffix)
23     {
24       return String.Format("{0}\0{1}\0{2}", identityPrefix, new
25 String(numericSeedPaddingCharacter,
26           minNumericSeedLength), identitySuffix);
27     }
28   }
29   public class FormulaType : LockPath.Keylight.Data.LUMA.RuntimeType
30   {
31     // Identity field.
32     private int _Field_3074643751;
33
34     public int Field_3074643751
35     {
36       get
37       {
38         return _Field_3074643751;
39       }
40       set
41       {
42         _ Field _3074643751 = value;
43       }
44     }
45
46     // "MSRP" field.
47     private Decimal? _Field_3451369357;
48
49     public Decimal? Field_3451369357
50     {
51       get
52       {
53         return _Field_3451369357;
54       }
55
56       set
57       {
58         _ Field _3451369357 = value;
59       }
60     }
61
62     // "Cost" field.
63     private Decimal? _Field_3452614551;
64
65     public Decimal? Field_3452614551
66     {
67       get
68       {
```

TABLE 19-continued

```
69         return _Field_3452614551;
70   }
71
72       set
73       {
74         _Field_3452614551 = value;
75       }
76     }
77
78     // Calculated field "Markup".
79     private Decimal? _Field_3485366712;
80
81     public Decimal? _Field_3485366712
82     {
83       get
84       {
85         return _Field_3485366712;
86       }
87
88       set
89       {
90         _Field_3485366712 = value;
91       }
92     }
93
94     public static LockPath.Keylight.Data.LUMA.CAFFEINE.ProjectionInfo[ ]
95   PropertyProjectionInfo =
96         new LockPath.Keylight.Data.LUMA.CAFFEINE.ProjectionInfo[ ]
97         {
98         new LockPath.Keylight.Data.LUMA.CAFFEINE.ProjectionInfo(new int[ ] {32},
99   "Field_3451369357",
100         new LockPath.Keylight.Data.FieldPath(33)),
101       new LockPath.Keylight.Data.LUMA.CAFFEINE.ProjectionInfo(new int[ ] {32},
102  "Field_3452614551",
103         new LockPath.Keylight.Data.FieldPath(9))
104       };
105
106     public FormulaType(int Field_3074643751, Decimal? Field_3485366712, Decimal?
107  Field_3451369357,
108         Decimal? Field_3452614551)
109     {
110       _Field_3074643751 = Field_3074643751;
111       _Field_3485366712 = Field_3485366712;
112       _Field_3451369357 = Field_3451369357;
113       _Field_3452614551 = Field_3452614551;
114     }
115   }
116 }
```

Translation with respect to a third example is shown below in Tables 20 and 21. Table 20 shows the translation template for the third example, while Table 21 shows its transformed formula method.

TABLE 20

```
1 namespace RuntimeFormula
2 {
3    using static System.Math;
4    using DateTime = System.DateTime;
5    using Guid = System.Guid;
6    using String = System.String;
7    using IPAddress = LockPath.Keylight.Utility.IPAddressMk2;
8
9    public sealed class Record
10   {
11     public TResult GetValue<TResult>(string fieldPath)
12     {
13       return (TResult)System.Activator.CreateInstance(typeof(TResult));
14     }
15
16     public TResult Min<TResult>(string fieldPath,
17   System.Linq.Expressions.Expression<System.Func<Record, bool>>
18         subRecordFilter = null)
19     {
20       return (TResult)System.Activator.CreateInstance(typeof(TResult));
21     }
```

TABLE 20-continued

```
22
23      public TResult Max<TResult>(string fieldPath,
24 System.Linq.Expressions.Expression<System.Func<Record, bool>>
25          subRecordFilter = null)
26      {
27          return (TResult)System.Activator.CreateInstance(typeof(TResult));
28      }
29
30      public TResult Average<TResult>(string fieldPath,
31 System.Linq.Expressions.Expression<System.Func<Record,
32          bool>> subRecordFilter = null)
33      {
34          return (TResult)System.Activator.CreateInstance(typeof(TResult));
35      }
36
37      public TResult Sum<TResult>(string fieldPath,
38 System.Linq.Expressions.Expression<System.Func<Record, bool>>
39          subRecordFilter = null)
40      {
41          return (TResult)System.Activator.CreateInstance(typeof(TResult));
42      }
43
44      public TResult Count<TResult>(string fieldPath,
45 System.Linq.Expressions.Expression<System.Func<Record, bool>>
46          subRecordFilter = null)
47      {
48          return (TResult)System.Activator.CreateInstance(typeof(TResult));
49      }
50  }
51
52
53  public sealed class FormulaWrapper
54  {
55      public static String Formula_1(Record record)
56      }
57          return String.Format("Verbose Description:01 = 01:01",
58 record.GetValue<String>("Description"),
59 record.GetValue<DateTime?>("UpdatedAt"),
60 record.GetValue<DateTime?>("Facility.CreatedBy.DateOfBirth"));
61      }
62
63      public static Date Time? Formula_2(Record record)
64      }
65          return record.GetValue<DateTime?>("Facility.CreatedBy.DateOfBirth");
66      }
67
68      public static double? Formula_3(Record record)
69      }
70          return record.Average<double?>("Vulnerabilities.SeverityLevel.Weight",
71              r => r.GetInt("SeverityLevel.Weight") ! = null);
72      }
73
74      public static String IdentitySeed(String identityPrefix, int
75 minNumericSeedLength, char
76          numericSeedPaddingCharacter, String identitySuffix)
77      {
78          return String.Format("{0}\0{1}\0{2}", identityPrefix, new
79 String(numericSeedPaddingCharacter,
80              minNumericSeedLength), identitySuffix);
81      }
82  }
83 }
```

TABLE 21

```
1 namespace RuntimeFormula
2 {
3     using static System.Math;
4     using DateTime = System.DateTime;
5     using Guid = System.Guid;
6     using String = System.String;
7     using IPAddress = LockPath.Keylight.Utility.IPAddressMk2;
8
9     public sealed class FormulaWrapper
10    {
11        public static String Formula_1(LockPath.Keylight.Data.LUMA.RuntimeType record)
12        {
```

TABLE 21-continued

```
13          return String.Format("Verbose Description:{0} - {1}:{2}"
14  (String)record.GetValue("Field_3955208782"),
15          (DateTime?)record.GetValue("Field_3451238287"),
16  (DateTime?)record.GetValue("Field_1508559810"));
17        }
18
19        public static DateTime? Formula_2(LockPath.KeyLight.Data.LUMA.RuntimeType
20  record)
21        {
22          return (DateTime?)record.GetValue("Field_1508559810");
23        }
24
25        public static double? Formula_3(LockPath.KeyLight.Data.LUMA.RuntimeType
26  record)
27        {
28          return (double?)record.GetValue('Field_4237443165");
29        }
30      }
31
32      public class FormulaType : LockPath.Keylight.Data.LUMA.RuntimeType
33      {
34        private int _Field_3074643751;
35
36        public int Field_3074643751
37        {
38          get
39          {
40            return _Field_3074643751;
41          }
42
43          set
44          {
45            _Field_3074643751 = value;
46          }
47        }
48
49        private System.String _Field_3955208782;
50
51        public System.String Field_3955208782
52        {
53          get
54          {
55            return _Field_3955208782;
56          }
57
58          set
59          {
60            _Field_3955208782 =value;
61          }
62        }
63
64        private System.DateTime? _Field_3451238287;
65
66        public System.DateTime? Field_3451238287
67        {
68          get
69          {
70            return _Field_3451238287;
71          }
72
73          set
74          {
75            _Field_3451238287 = value;
76          }
77        }
78
79        private Date Time? _Field_1508559810;
80
81        public Date Time? Field_1508559810
82        {
83          get
84          {
85            return _Field_1508559810;
86          }
87
88          set
89          {
90            _Field_1508559810 =value;
91          }
92        }
```

TABLE 21-continued

```
 93
 94      private decimal? _Field_4237443165;
 95
 96      public decimal? Field_4237443165
 97      {
 98        get
 99        {
100          return _Field_4237443165;
101        }
102
103        set
104        {
105          _Field_4237443165 = value;
106        }
107      }
108
109      public static LockPath.Keylight.Data.LUMA.CAFFEINE.ProjectionInfo[ ]
110 PropertyProjectionInfo
111          = new LockPath.Keylight.Data.LUMA.CAFFEINE.ProjectionInfo[ ]
112      {
113        // Id.
114        new LockPath.Keylight.Data.LUMA.CAFFEINE.ProjectionInfo(new int[ ]{1, 2,
115 3}, "Field_3074643751",
116           new LockPath.Keylight.Data.FieldPath(300)),
117        // Description.
118        new LockPath.Keylight.Data.LUMA.CAFFEINE.ProjectionInfo(new int[ ]{1},
119 "Field_3955208782",
120           new LockPath.Keylight.Data.FieldPath(15)),
121        // UpdatedAt.
122        new LockPath.Keylight.Data.LUMA.CAFFEINE.ProjectionInfo(new int[ ]{1},
123 "Field_3451238287",
124           new LockPath.Keylight.Data.FieldPath(5905)),
125        // Facility.Created8y.DateOfBirth.
126        new LockPath.Keylight.Data.LUMA.CAFFEINE.ProjectionInfo(new int[ ]{1,
127 2}, "Field_1508559810",
128           new LockPath.Keylight.Data.FieldPath(4880, 782, 491)),
129        // Average/Vulnerabilities.SeverityLevel.Weight/[Filter] .
130        new LockPath.Keylight.Data.LUMA.CAFFEINE.ProjectionInfo(new int[ ]{3},
131 "Field_4237443165",
132           new LockPath.Keylight.Data.FieldPath(569, 242, 3206),
133           LockPath.Keylight.Data.AggregateType.Average,
134           r = > (int?)r["ServerityLevel", "Weight"] != null)
135      };
136
137      public FormulaType(int Field_3074643751, System.String Field_3955208782,
138 System.DateTime? Field_3451238287,
139         Date Time? Field_1508559810, decimal? Field_4237443165)
140      {
141        _Field_3074643751 = Field_3074643751;
142        _Field_3955208782 = Field_3955208782;
143        _Field_3451238287 = Field_3451238287;
144        _Field_1508559810 = Field_1508559810;
145        _Field_4237443165 = Field_4237443165;
146      }
147    }
148 }
```

One modification is the removal of the Record stub class and methods. Their use as quarantine proxies is rendered moot post-translation as all of the invocations have been, by design, intercepted and routed to the relevant endpoints as can be seen in the translated formula methods. Note that each method's "record" parameter has been altered to instead be of the FormulaType (defined immediately after the FormulaWrapper class) and all prior stub Record class method calls have been converted to RuntimeType dynamic property accessors.

Just below the FomulaWrapper class is the projection class "FormulaType" that is extends the RuntimeType base class. The translation phase could just has easily have made the Formula methods accept native FormulaType values with direct property accessors instead using RuntimeType's reflection based GetValue method but RuntimeType-aware functionality already exists in ROSETTA which is critical to the projection phase. The unique property names are simply a hash of the field path and, when applicable, the aggregation type and record filter. Within the class is embedded an array of ProjectionInfo structures. These contain a smattering of metadata for mapping the projected property names to the IDs of the formulas using then and their field paths of origin and other projection information as most of this information is already on hand at the parsing phase vs. discarding it and inevitably replicating it later.

Returning to FIG. 2, in act 211, the facility compiles the transform perform a method obtained in act 210. In act 212, the facility makes the compiled formula method obtained in act 211 accessible to the application and/or service that relies on the computed field or fields defined in the formula method. After act 212, this process concludes.

After translation, the resultant code is ready for compilation. In some embodiments, the facility compiles the component formula kernel into a DLL that can subsequently be bootstrapped into a main application or service's runtime.

By using reflection, the manifest of the bootstrapped assembly is combed for the wrapper class, formula method handles, projection type and metadata and cache that information for quick recall at execution time.

Typical client-side record commits utilize a given component kernel in the most straightforward way. When creating or updating a record, all computed fields for that formula are expected to execute. Immediately after the full LUMARecord has been committed, the framework invokes a MetaRecordSet query filtered to the record's ID. The resulting expression is then altered by iterating over each property of the kernel's projection class and creating a projection from a LUMARecord property or query.

The most straightforward property projections are member accessors that originated with stub record "GetValue" calls. The field path associated with the call (derived from the metadata embedded in the projection class) is converted into a LINQ-compatible nested member accessor with a feature of the ROSETTA framework (described at length in the ROSETTA documentation) built upon the starting record type of the component being projected from.

Field paths for aggregate projections are comprised of any number of record-to-record relations, followed by a 1:N relation, then followed again by any number of relations before ending with a value field. This field path is then split into two fragments upon the 1:N boundary with first fragment of which receives the 1:N relation. Both fragments are transformed in a way similar to the prior member accessor however the latter fragment is rooted upon the record type that the first field path ended on. If a filter was applied, then the first parameter is amended with the formula's filter fragment cached in the kernel. Additionally, if the targeted record supports soft deletion, then an additional filter to remove all deleted records from consideration is generated and applied. The augmented first path is then amended with the LINQ aggregate call matching the original method call chosen method which itself receives the latter value selection fragment designating which field to perform its action on.

Once a selection expression has been generated for each property, the facility bundles them into a LINQ constructor expression matching the parameter order of the projection class constructor which is then rolled into a LINQ projection call on the MetaRecordSet primed above. For scenarios in which calculation of only a subset of the computed fields is needed, the same projection class is used but the cached metadata mappings are consulted for their constructor positions and null expressions are generated to take the place of the omitted values.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

I claim:

1. A method in a computing system, comprising:
   receiving a formula that, when evaluated with respect to a particular row of each of a plurality of database rows, produces a respective value for a distinguished database field of the particular row, the formula expressed as a method in a distinguished procedural programming language;
   transforming the formula method into a first syntax tree that defines, for the particular row of each of the plurality of database rows, the respective value for the distinguished database field of the particular row, wherein the transforming is based on the distinguished procedural programming language;
   traversing the first syntax tree that defines, for the particular row of each of the plurality of database rows, the respective value for the distinguished database field of the particular row, wherein the traversal identifies one or more prohibited language features of the distinguished procedural programming language;
   generating an error in relation to the identified one or more prohibited language features of the distinguished procedural programming language;
   receiving a modification to the formula method that excludes the prohibited language features of the distinguished procedural programming language;
   transforming the modified formula method into a second syntax tree that defines, for the particular row of each of the plurality of database rows, the respective value for the distinguished database field of the particular row;
   modifying the second syntax tree that defines, for the particular row of each of the plurality of database rows, the respective value for the distinguished database field of the particular row, to provide variable context, field projection, runtimetype dynamic property accessors, and/or field path mapping; and
   compiling the modified second syntax tree that defines, for the particular row of each of the plurality of database rows, the respective value for the distinguished database field of the particular row, into a second version of the formula method in the distinguished procedural programming language.

2. The method of claim 1, further comprising:
   compiling the second version of the formula method to obtain machine code for the second version of the formula method.

3. The method of claim 2, wherein the executed machine code performs bulk commits across the at least a portion of the plurality of database rows.

4. The method of claim 2, further comprising:
   for each particular database row of the plurality of database rows in a database table:
      causing the machine code for the second version of the formula method to be executed to determine a value for the distinguished database field of the particular database row based on values of one or more database fields of the particular database row other than the distinguished database field.

5. The method of claim 1,
   wherein the formula method includes an assignment to a variable with an assigned value; and
   wherein the formula method includes multiple references to the value assigned to the variable.

6. The method of claim 1, further comprising:
   before transforming the formula method into the first syntax tree that defines, for the particular row of each of the plurality of database rows, the respective value for the distinguished database field of the particular row, constructing a translation template around the formula method, the translation template expressed in the distinguished procedural programming language.

7. The method of claim 1,
   wherein the method further comprises:
      analyzing the second syntax tree to determine whether the second syntax tree reflects any of a set of actions prohibited for function methods, and
   wherein the compiling the modified second syntax tree that defines, for the particular row of each of the plurality of database rows, the respective value for the distinguished database field of the particular row, into the second version of the formula method is performed in response to the second syntax tree being determined not to reflect any of the set of actions prohibited for function methods.

8. The method of claim 1, wherein the one or more prohibited language features include one or more of: types not on a list of approved types, calls to methods not on a list of approved methods, invalid field paths; or any combination thereof.

9. The method of claim 1, further comprising:
before transforming the modified formula method into the second syntax tree that defines, for the particular row of each of the plurality of database rows, the respective value for the distinguished database field of the particular row, embedding the modified formula method in a validation template expressed in the distinguished procedural programming language.

10. The method of claim 1, wherein the second version of the formula method in the distinguished procedural programming language specifies accessing each database row only once.

11. The method of claim 1, wherein the modifying the second syntax tree that defines, for the particular row of each of the plurality of database rows, the respective value for the distinguished database field of the particular row, is performed by providing variable context, field projection, and field path mapping.

12. The method of claim 1, wherein the modifying the second syntax tree that defines, for the particular row of each of the plurality of database rows, the respective value for the distinguished database field of the particular row, is performed by providing a composite projection type having properties comprising distinct field value accessors, unique aggregate calls factoring, a target field of each formula, and an identifier field of the record being operated on.

13. The method of claim 1, wherein the modifying the second syntax tree that defines, for the particular row of each of the plurality of database rows, the respective value for the distinguished database field of the particular row, is performed by providing a composite projection type having properties comprising distinct field value accessors, a target field of each formula, and an identifier field of the record being operated on.

14. One or more memories collectively having contents adapted to cause a computing system to perform a method, the method comprising:
receiving a formula that, when evaluated with respect to a particular row of each of a plurality of database rows, produces a respective value for a distinguished database field of the particular row, the formula expressed as a method in a distinguished procedural programming language;
transforming the formula method into a first syntax tree that defines, for the particular row of each of the plurality of database rows, the respective value for the distinguished database field of the particular row;
traversing the first syntax tree that defines, for the particular row of each of the plurality of database rows, the respective value for the distinguished database field of the particular row, wherein the traversal identifies one or more prohibited language features of the distinguished procedural programming language;
generating an error in relation to the identified one or more prohibited language features of the distinguished procedural programming language;

receiving a modification to the formula method that excludes the prohibited language features of the distinguished procedural programming language;
transforming the modified formula method into a second syntax tree that defines, for the particular row of each of the plurality of database rows, the respective value for the distinguished database field of the particular row;
modifying the second syntax tree that defines, for the particular row of each of the plurality of database rows, the respective value for the distinguished database field of the particular row, to provide variable context, field projection, runtimetype dynamic property accessors, and/or field path mapping; and
compiling the modified second syntax tree that defines, for the particular row of each of the plurality of database rows, the respective value for the distinguished database field of the particular row, into a second version of the formula method in the distinguished procedural programming language.

15. The one or more memories of claim 14, the method further comprising:
compiling the second version of the formula method to obtain machine code for the second version of the formula method.

16. The one or more memories of claim 15, the method further comprising:
executing the obtained machine code to populate the values into at least a portion of the distinguished database fields.

17. The one or more memories of claim 16, wherein the executed machine code performs bulk commits across the at least a portion of the distinguished database fields.

18. The one or more memories of claim 15, the method further comprising:
for each particular database row of the plurality of database rows in a database table:
causing the machine code for the second version of the formula method to be executed to determine a value for the distinguished database field of the particular database row based on values of one or more database fields of the particular database row other than the distinguished database field.

19. The one or more memories of claim 14, wherein the distinguished procedural programming language is a variant of the C programming language.

20. The one or more memories of claim 14, wherein the distinguished procedural programming language is C#.

21. The one or more memories of claim 14,
wherein the formula method includes an assignment to a variable with an assigned value; and
wherein the formula method includes multiple references to the value assigned to the variable.

22. The one or more memories of claim 14,
wherein the method further comprises:
analyzing the second syntax tree to determine whether the second syntax tree reflects any of a set of actions prohibited for function methods, and
wherein the compiling the modified second syntax tree into the second version of the formula method is performed in response to the second syntax tree being determined not to reflect any of the set of actions prohibited for function methods.

23. The one or more memories of claim 14, wherein the second version of the formula method in the distinguished procedural programming language specifies accessing each database row only once.

24. The one or more memories of claim 14, wherein the modifying the second syntax tree that defines, for the particular row of each of the plurality of database rows, the respective value for the distinguished database field of the particular row, is performed by providing variable context, field projection, and field path mapping.

25. The one or more memories of claim 14, wherein the modifying the second syntax tree that defines, for the particular row of each of the plurality of database rows, the respective value for the distinguished database field of the particular row, is performed by providing a composite projection type having properties comprising distinct field value accessors, unique aggregate calls factoring, a target field of each formula, and an identifier field of the record being operated on.

26. The one or more memories of claim 14, wherein the modifying the second syntax tree that defines, for the particular row of each of the plurality of database rows, the respective value for the distinguished database field of the particular row, is performed by providing a composite projection type having properties comprising distinct field value accessors, a target field of each formula, and an identifier field of the record being operated on.

27. One or more memories collectively containing a formula method data structure, comprising:
a method definition expressed in procedural source code that returns a calculated field value for a database row against which it is invoked, wherein the method definition was created by:
transforming—
a formula method, that, when evaluated with respect to a particular row of each of a plurality of database rows, produces a respective value for a distinguished database field of the particular row,
into a first syntax tree that defines that defines, for the particular row of each of the plurality of database rows, the respective value for the distinguished database field of the particular row;
traversing the first syntax tree that defines, for the particular row of each of the plurality of database rows, the respective value for the distinguished database field of the particular row, wherein the traversal identifies one or more prohibited language features of the distinguished procedural programming language;
generating an error in relation to the identified one or more prohibited language features of the distinguished procedural programming language;
receiving a modification to the formula method that excludes the prohibited language features of the distinguished procedural programming language;
transforming the modified formula method into a second syntax tree that defines, for the particular row of each of the plurality of database rows, the respective value for the distinguished database field of the particular row;
modifying the second syntax tree that defines, for the particular row of each of the plurality of database rows, the respective value for the distinguished database field of the particular row; and
compiling the modified second syntax tree that defines, for the particular row of each of the plurality of database rows, the respective value for the distinguished database field of the particular row, into the method definition.

28. The one or more memories of claim 27, the data structure further comprising:
procedural source code constituting a template providing contextual resources usable to validate the method definition.

29. The one or more memories of claim 27, the data structure further comprising:
procedural source code constituting a template providing contextual resources usable to translate the method definition for compiling.

30. One or more memories collectively containing a formula method data structure, comprising:
a second method definition expressed in procedural source code that returns a calculated field value for a database row against which it is invoked,
wherein the second method definition is obtained by:
receiving a method definition that, when evaluated with respect to a particular row of each of a plurality of database rows, produces a respective value for a distinguished database field of the particular row, the method definition expressed in a distinguished procedural programming language;
transforming the method definition into a first syntax tree;
traversing the first syntax tree, wherein the traversal identifies one or more prohibited language features of the distinguished procedural programming language;
generating an error in relation to the identified one or more prohibited language features of the distinguished procedural programming language;
receiving a modification to the method definition that excludes the prohibited, language features of the distinguished procedural programming language;
transforming the modified method definition into a second syntax tree;
modifying the second syntax tree by adding variable context, field projection, runtimetype dynamic property accessors, and/or field path mapping; and
using the second syntax tree to generate the second method definition expressed in the procedural source code.

* * * * *

UNITED STATES PATENT AND TRADEMARK OFFICE
CERTIFICATE OF CORRECTION

Page 1 of 1

PATENT NO. : 10,083,016 B1
APPLICATION NO. : 15/617949
DATED : September 25, 2018
INVENTOR(S) : Timothy R. Norman It is certified that error appears in the above-identified patent and that said Letters Patent is hereby corrected as shown below:

In the Specification

In Column 4, Line 50, delete "-" and insert -- = --, therefor.

In Column 34, Line 38, after "417" insert -- . --.

In the Claims

In Column 59, Line 36, in Claim 27, before "that defines," delete "that defines".

In Column 60, Line 42, in Claim 30, delete "prohibited," and insert -- prohibited --, therefor.

Signed and Sealed this
Twenty-second Day of January, 2019

Andrei Iancu
*Director of the United States Patent and Trademark Office*